United States Patent [19]
Goldman et al.

[11] Patent Number: 5,196,275
[45] Date of Patent: Mar. 23, 1993

[54] ELECTRICAL POWER STORAGE APPARATUS

[75] Inventors: Arnold J. Goldman, Jerusalem; Eugeny Pecherer, Netanya; Jonathan Goldstein, Jerusalem; Arieh Meitav, Rishon Lezion, all of Israel

[73] Assignee: Electric Fuel Limited, Jerusalem, Israel

[21] Appl. No.: 636,606

[22] Filed: Dec. 31, 1990

Related U.S. Application Data

[63] Continuation-in-part of Ser. No. 560,032, Jul. 27, 1990, abandoned, and a continuation-in-part of Ser. No. 555,921, Jul. 19, 1990, Pat. No. 5,121,044.

[51] Int. Cl.$^5$ ............................................. H01M 4/02
[52] U.S. Cl. ...................................... 429/27; 429/17; 429/19; 429/34
[58] Field of Search .................. 429/17, 19, 27, 34, 429/101

[56] References Cited

U.S. PATENT DOCUMENTS

| | | | |
|---|---|---|---|
| 2,597,116 | 5/1952 | Marsal et al. | 429/28 |
| 3,758,342 | 9/1973 | Baba | 429/27 |
| 4,003,753 | 1/1977 | Hall | 429/199 |
| 4,950,561 | 8/1990 | Niksa et al. | 429/27 |

FOREIGN PATENT DOCUMENTS

| 1439756 | 6/1976 | United Kingdom | 429/28 |
|---|---|---|---|

Primary Examiner—Asok Pal
Assistant Examiner—C. Everhart
Attorney, Agent, or Firm—Helfgott & Karas

[57] ABSTRACT

An electrical power storage unit has one or more metal-gas electrical cells, each cell including a pair of generally planar outer electrode units configured to define therebetween an interior space for containing an electrical power storage medium and an inner electrode unit mounted between the pair of outer electrode units so as to be in electrically conductive contact with the electrical power storage medium and define a plurality of volumes each having a pair of open ends, each open end facing an adjacent outer electrode unit. The power storage medium is a slurry containing active metal particles and an electrolyte solution. The inner electrode unit is configured for removable insertion within the interior space. The volumes defined by the inner electrode unit are configured so as to contain portions of the power storage slurry such that removal of the inner electrode unit from the interior space causes the simultaneous removal therefrom of the major part of the power storage slurry. Each outer electrode unit includes a generally planar gas electrode, a device for separating the metal particles from the gas electrode, and a device for preventing mechanical damage to the device for separating upon removal of the inner electrode unit from the interior space and upon insertion of the inner electrode unit into that space.

2 Claims, 30 Drawing Sheets

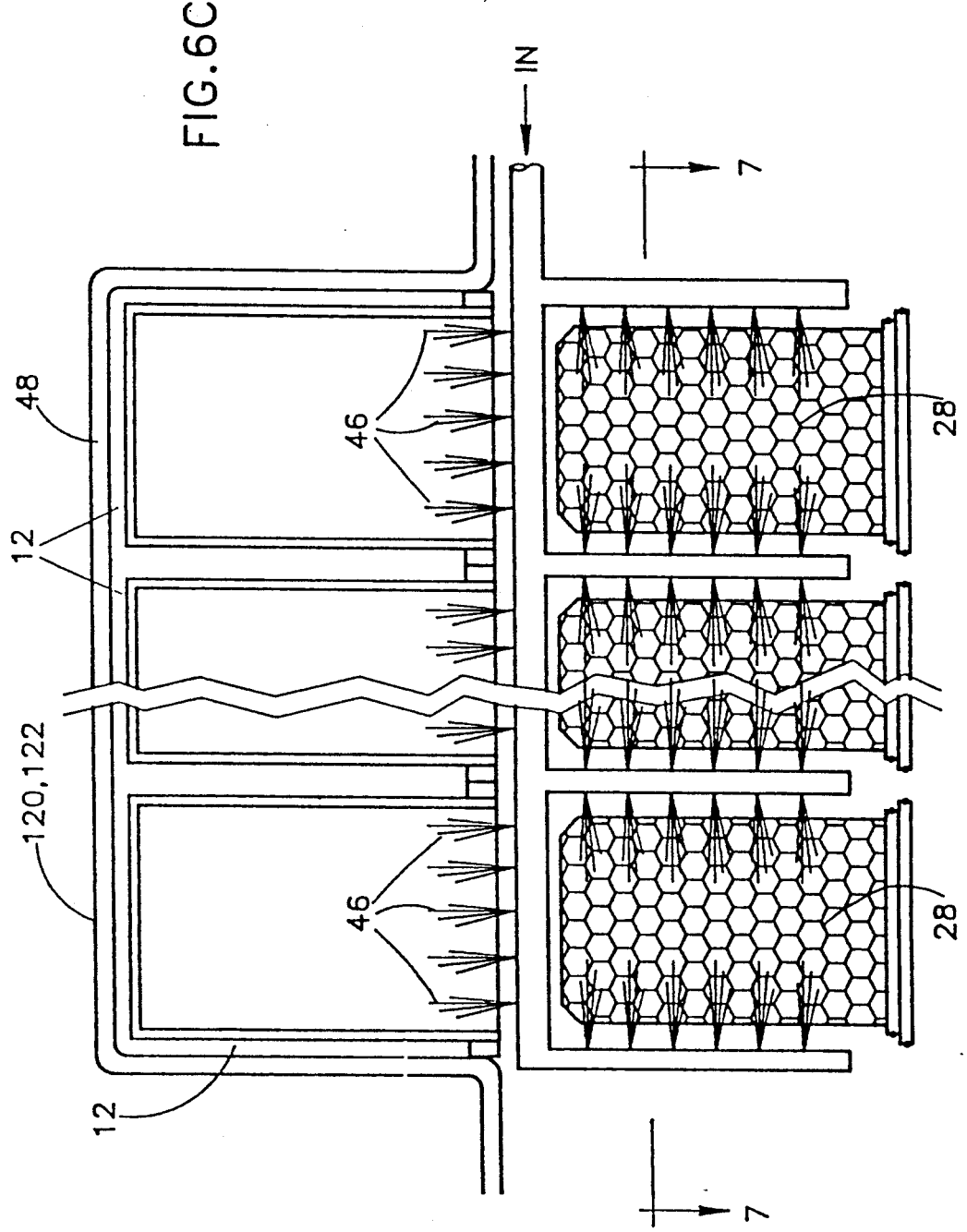

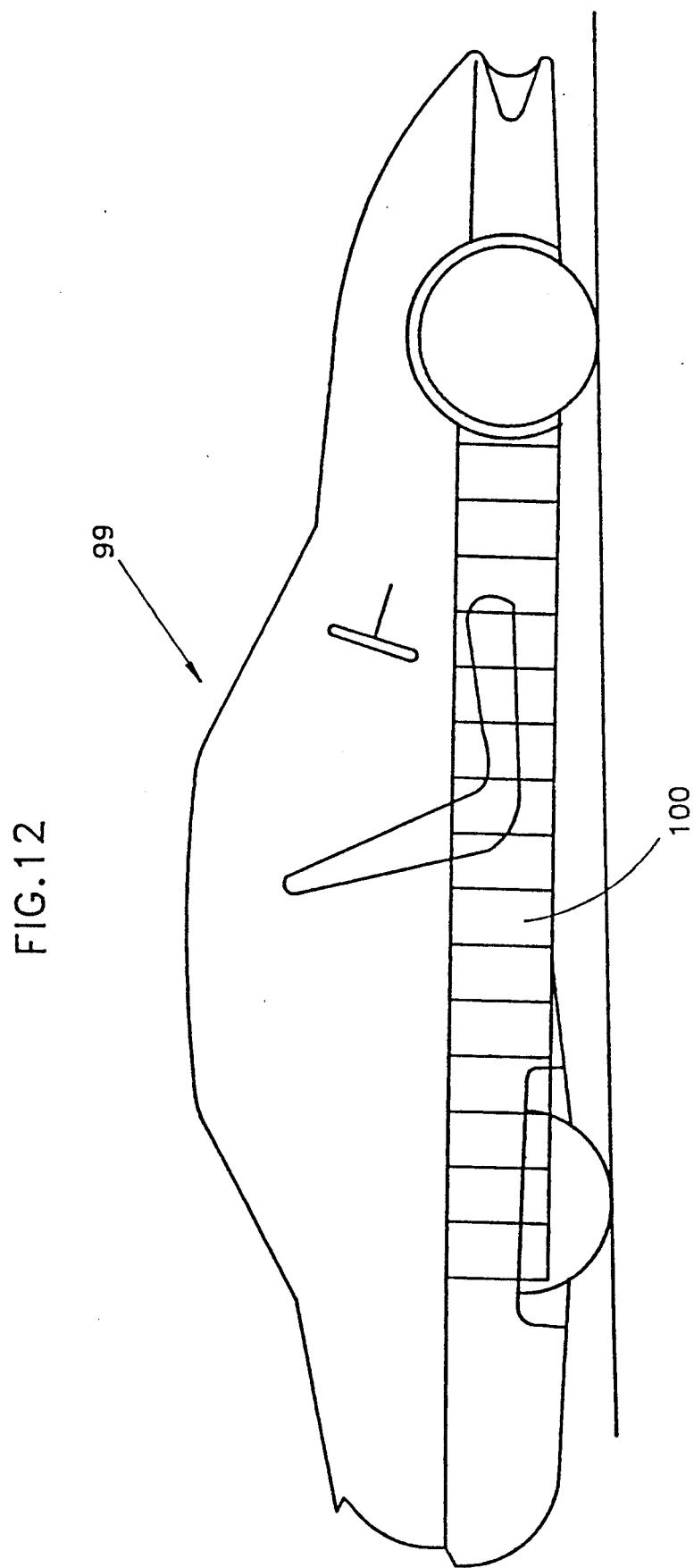

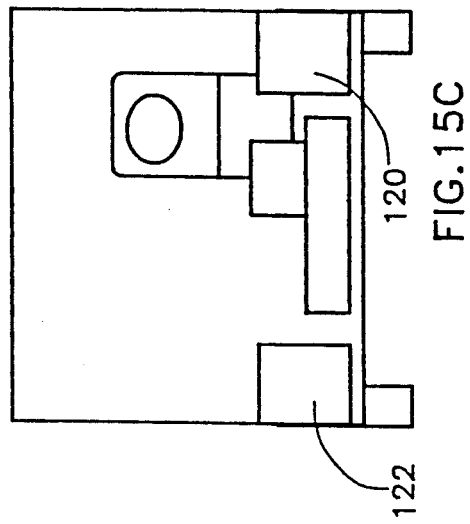
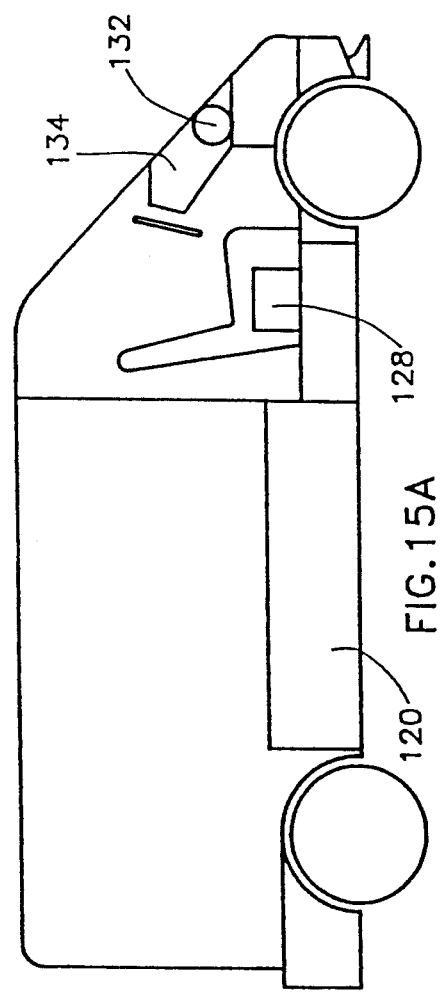
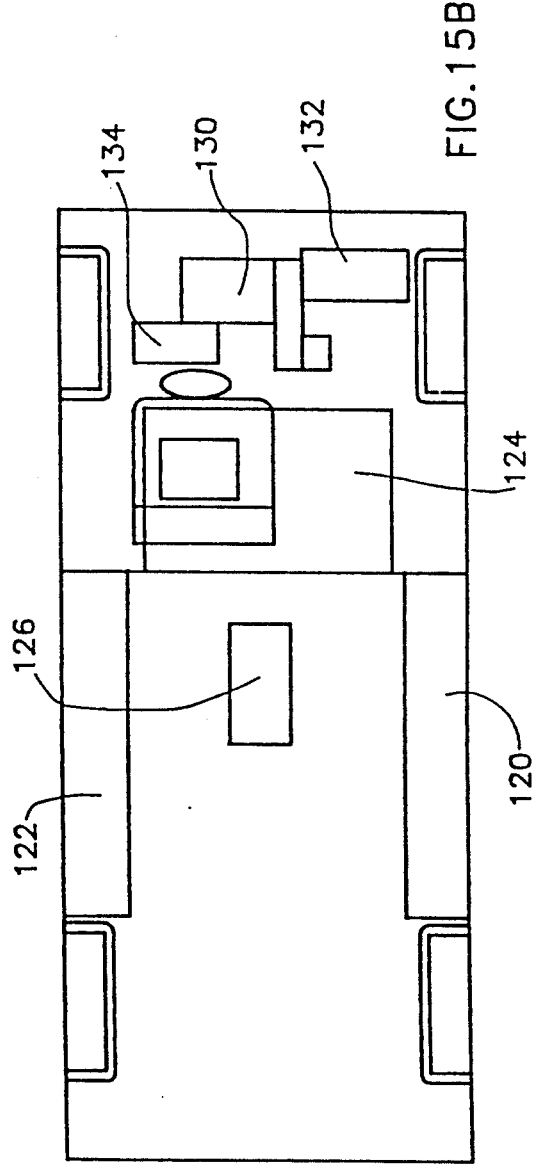
FIG. 15C
FIG. 15B
FIG. 15A

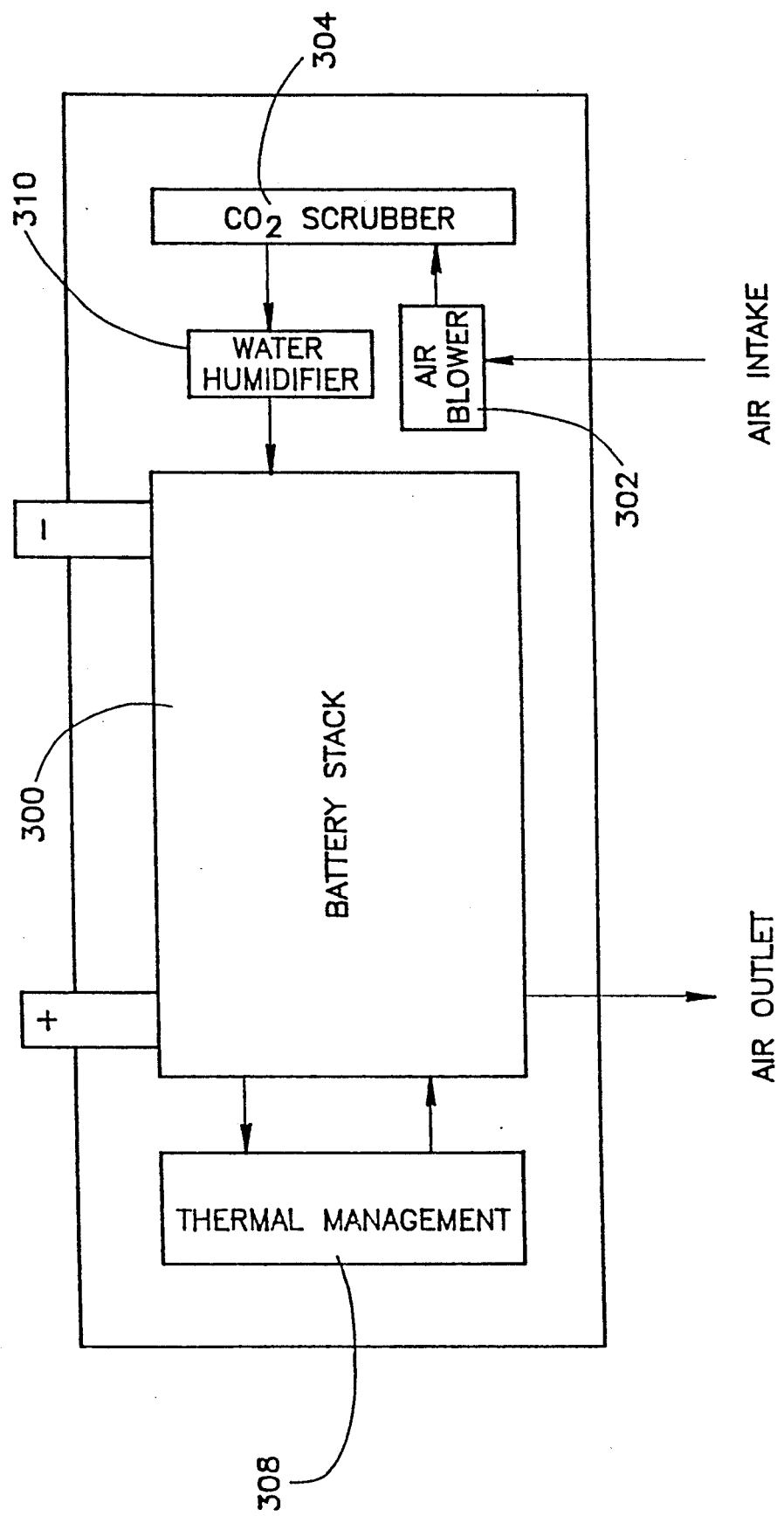

ELECTRICAL POWER STORAGE APPARATUS

REFERENCE TO CO-PENDING APPLICATIONS

The present application is a continuation-in-part of U.S. application Ser.No. 07/560,032, filed Jul. 27, 1990, entitled RECHARGEABLE ELECTRICAL POWER STORAGE UNIT FOR USE IN AN ELECTRICAL TRANSPORT SYSTEM, abandoned and of U.S. application Ser. No. 07/555,921, filed Jul. 19, 1990, entitled ELECTRICAL ENERGY SYSTEM, U.S. Pat. No. 5,121,044. U.S. application Ser. No. 07/560,032, filed Jul. 27, 1990, entitled RECHARGEABLE ELECTRICAL POWER STORAGE UNIT FOR USE IN AN ELECTRICAL TRANSPORT SYSTEM, is a continuation-in-part of U.S. application Ser. No. 07/555,921, filed Jul. 19, 1990, entitled ELECTRICAL ENERGY SYSTEM U.S. Pat. No. 5,121,044.

FIELD OF THE INVENTION

The present invention relates to rechargeable electrical power storage apparatus.

BACKGROUND OF THE INVENTION

Over the years, various proposals have been made for electrically powered vehicles. To date, for a number of reasons, electric vehicle systems have yet to become commercial for urban and highway applications.

There have been proposals to employ zinc/air batteries for urban vehicle propulsion. An example is the following publication:

Improved slurry zinc/air systems as batteries for urban vehicle propulsion, by P.C. Foller, Journal of Applied Electrochemistry 16 (1986), 527-543.

Metal/air battery structures are described in the following publications:

U.S. Pat. No. 4,842,963, entitled Zinc Electrode and Rechargeable Zinc-Air Battery;

U.S. Pat. No. 4,147,839, entitled Electrochemical Cell with Stirred Slurry;

U.S. Pat. No. 4,908,281, entitled Metal/air Battery with Recirculating Electrolyte;

U.S.Pat. No. 4,925,744, entitled Primary Aluminum-Air Battery;

U.S. Pat. No. 3,716,413, entitled Rechargeable Electrochemical Power Supply;

U.S. Pat. No. 4,925,744, entitled Primary Aluminum-Air Battery;

Electrical energy storage systems are described in the following publications:

U.S. Pat. No. 4,843,251 entitled Energy Storage and Supply Recirculating Electrolyte;

Energy on Call by John A. Casazza et al, IEEE Spectrum June, 1976, pp 44-47.

U.S. Pat. No. 4,275,310, entitled Peak Power Generation;

U.S. Pat. No. 4,124,805, entitled Pollution-Free Power Generating and Peak Power Load Shaving System;

U.S. Pat. No. 4,797,566, entitled Energy Storing Apparatus.

U.S. Pat. No. 3,847,671, entitled Hydraulically-Refuelable Metal-Gas Depolarized Battery System, describes metal-gas battery system constructed so that both solid and liquid contents can be drained from the battery after discharge. There are provided a negative grid and a gas depolarized electrode which together define a compartment that can be refilled with a slurry of electrolyte and an active metal powder, thereby recharging the battery in a relatively short time. There is also provided means for flushing out the battery with an electrolyte solution prior to refilling with a fresh batch of slurry.

The teachings of the foregoing publications are hereby incorporated herein by reference.

As described, for example, in U.S. Pat. No. 3,847,671, the replacement of a discharged metal-based slurry in a metal-air power storage system conventionally requires pumped removal of discharged slurry from the system, and the pumping of fresh slurry into the system.

In providing batteries that are powerful enough to power relatively heavy objects such as vehicles, it is an aim to maximize the current density of the battery. In achieving this, however, metal-air battery systems are becoming of increasingly more lightweight construction and they are less able, therefore, to withstand the pressures that may be caused by the pumping of slurry, both into and out of the battery.

The following additional references describe various energy storage systems: U.S. Pat. Nos. 3,414,437; 3,647,542; 3,979,222; 3,849,202; 4,136,232; 4,166,885 and 4,517,248.

U.S. Pat. No. 4,294,891, entitled Intermittently Refuelable Implantable Bio-Oxidant Fuel Cell, describes the use of a soluble liquid fuel supported between cathode and anode assemblies each of which includes a current collector formed of expanded gold mesh.

SUMMARY OF THE INVENTION

The present invention seeks to provide an improved, rechargeable, electrical power storage cell including a central current collector element surrounded by a static bed of active metal particles saturated with a suitable electrolyte solution, wherein the static bed of particles is supported largely by the central current collector element, thereby preserving the structural integrity of the bed.

A further aim of the invention is to provide a mechanically rechargeable electrical power storage cell employing a slurry containing active metal particles and an electrolyte solution, wherein the cell is mechanically rechargeable by means other than pumping.

An additional aim of the invention is to provide a mechanically rechargeable electrical power storage cell employing an electrical power storage slurry and wherein there is provided improved separation apparatus, thereby increasing the performance of the cell.

Yet a further aim of the present invention is to provide an electrically powered vehicle utilizing the improved rechargeable power storage cell of the invention and a system and method for efficiently recharging the storage cell.

There is provided, therefore, in accordance with an embodiment of the invention, an electrical power storage unit having one or more electrical cells, each cell including a pair of generally planar outer electrode units configured to define therebetween an interior space for containing an electrical power storage medium; and inner electrode apparatus mounted between the pair of outer electrode units so as to be in electrically conductive contact with the electrical power storage medium. The inner electrode apparatus defines a plurality of volumes each having a pair of open ends, each open end facing an adjacent outer electrode unit.

There is also provided, in accordance with an additional embodiment of the invention, a rechargeable electrical power storage unit having one or more electrical metal-gas cells, each cell including a pair of generally planar outer electrode units configured to define therebetween an interior space for a power storage slurry containing active metal particles and an electrolyte solution; and inner electrode apparatus configured for removable insertion within the interior space and having integral apparatus for removing the majority of the power storage slurry from the interior space upon removal of the inner electrode apparatus therefrom. Each of the outer electrode units includes a generally planar gas electrode; apparatus for separating the metal particles from the gas electrode; and apparatus for preventing mechanical damage to the apparatus for separating upon removal of the inner electrode apparatus from the interior space and upon insertion of the inner electrode apparatus therein.

Additionally in accordance with the present embodiment, the outer electrode units also include apparatus for separating dissolved metal species in the slurry from the gas electrode; and/or apparatus for mechanically separating from the gas electrode the apparatus for separating dissolved metal species in the slurry from the gas electrode so as to permit the circulation of selected fluids therepast.

In accordance with a further embodiment of the invention, there is provided an electrical power storage system including an electrical power storage unit having one or more rechargeable electrical cells, each of which includes a pair of generally planar outer electrode units configured to define therebetween an interior space for an electrical power storage medium; and inner electrode apparatus removably mounted between the pair of outer electrode units so as to be in electrically conductive contact with the electrical power storage medium. The inner electrode apparatus defines a plurality of volumes each having a pair of open ends, each open end facing an adjacent outer electrode unit. The system also includes apparatus for replacing a discharged volume of the electrical power storage medium with a charged volume of the electrical power storage medium.

Additionally in accorance with the present embodiment, the apparatus for replacing includes apparatus for removing the inner electrode apparatus from the interior space so as to remove therefrom the discharged volume of the electrical power storage medium; apparatus for immersing the inner electrode apparatus in a body of charged slurry so as to enable the charged slurry to flow into and fill each of the plurality of volumes; and apparatus for replacing the inner electrode apparatus in the interior space.

In accordance with an additional embodiment of the invention, there is provided electrically powered transport apparatus including an electrically powered vehicle having vehicle drive apparatus, and rechargeable electrical power storage apparatus electrically coupled to the vehicle drive apparatus, and including one or more rechargeable electrical cells. Each cell includes a pair of generally planar outer electrode units configured to define therebetween an interior space for containing an electrical power storage medium; and inner electrode apparatus mounted between the pair of outer electrode units so as to be in electrically conductive contact with the electrical power storage medium and defining a plurality of volumes each having a pair of open ends, each open end facing an adjacent outer electrode unit.

In accordance with a further embodiment of the invention, there is provided electrically powered transport apparatus including an electrically powered vehicle having vehicle drive apparatus; and rechargeable electrical power storage apparatus electrically coupled to the vehicle drive apparatus, and including one or more rechargeable electrical cells. Each cell includes a pair of generally planar outer electrode units configured to define therebetween an interior space for containing a power storage slurry containing active metal particles and an electrolyte solution; and inner electrode apparatus configured for removable insertion within the interior space and having integral apparatus for removing the majority of the power storage slurry from the interior space upon removal of the inner electrode apparatus therefrom. Each outer electrode unit includes a generally planar gas electrode; apparatus for separating the active metal particles from the gas electrode; and apparatus for preventing mechanical damage to the apparatus for separating upon removal of the inner electrode apparatus from the interior space and upon insertion of the inner electrode apparatus therein.

Additionally in accordance with the present embodiment, the outer electrode units also include apparatus for separating dissolved metal species in the slurry from the gas electrode; and/or apparatus for mechanically separating from the gas electrode the apparatus for separating dissolved metal species in the slurry from the gas electrode so as to permit the circulation of selected fluids therepast.

In accordance with a further embodiment of the invention, there is provided an electrical transport system including an electrically powered vehicle having vehicle drive apparatus; rechargeable electrical power storage apparatus electrically coupled to the vehicle drive apparatus, and including one or more rechargeable electrical cells. Each electrical cell includes a pair of generally planar outer electrode units configured to define therebetween an interior space for an electrical power storage medium; and inner electrode apparatus removably mounted between the pair of outer electrode units so as to be in electrically conductive contact with the electrical power storage medium. The inner electrode apparatus defines a plurality of volumes each having a pair of open ends, each open end facing an adjacent outer electrode unit. The system also includes apparatus for replacing a discharged volume of the electrical power storage medium with a charged volume of the electrical power storage medium.

According to yet a further embodiment of the invention, there is provided an electrical energy system which includes an electric utility having electricity generation apparatus and distribution lines; a plurality of electric vehicles, each having vehicle drive apparatus; a plurality of rechargeable electrical power storage units, each coupled to the vehicle drive apparatus of one of the electric vehicles, and having one or more electrical cells; and electrical power storage apparatus receiving electrical power from the electric utility and supplying electrical power to each of the rechargeable electrical power storage units and to the electric utility, when required. Each electrical cell includes a pair of generally planar outer electrode units configured to define therebetween an interior space for containing an electrical power storage medium; and inner electrode apparatus mounted between the pair of outer electrode units so as to be in electrically conductive contact with the electrical power storage medium. The inner electrode apparatus defines a plurality of volumes each having a pair of open ends, each open end thereof facing an adjacent outer electrode unit.

Additionally in accordance with the present embodiment, the electrical power storage medium is a power storage slurry containing active metal particles and an electrolyte solution; and the inner electrode apparatus is configured for removable insertion within the interior space and has integral apparatus for removing a majority of the power storage slurry from the interior space upon removal of the inner electrode apparatus therefrom. Each outer electrode unit includes a generally planar gas electrode, apparatus for separating the active metal particles from the gas electrode, and apparatus for preventing mechanical damage to the apparatus for separating upon removal of the inner electrode apparatus from the interior space and upon insertion of the inner electrode apparatus therein.

Further in accordance with the present embodiment, there is provided apparatus for replacing a discharged volume of the electrical power storage medium with a charged volume of the electrical power storage medium.

In accordance with yet a further embodiment of the invention, there is provided a method of recharging a metal-gas electrical power storage system employing an electrical power storage medium in the form of a slurry containing active metal particles and an electrolyte solution, and which system includes one or more cells, each having an interior space having an opening communicating with the exterior of the cell, the cell also enclosing a volume of the slurry in operative association with one or more gas electrodes and with an inner electrode defining a plurality of open-ended volumes each containing a portion of the volume of slurry. The method includes the steps of removing the inner electrode from the cell via the opening so as to remove therewith the slurry from the cell; removing the slurry contained by the plurality of volumes of the inner electrode; filling the plurality of open-ended volumes of the inner electrode with charged slurry; and reinserting the inner electrode into the cell through the opening.

Additionally in accordance with the present embodiment, the step of filling includes the step of immersing the inner electrode apparatus in a body of charged slurry so as to enable the charged slurry to flow into and fill each of the plurality of volumes.

In one further embodiment of the invention, there is provided an electrical energy system including an electric utility having electricity generation apparatus and distribution lines; and electrical power storage apparatus including one or more metal-air electrical power storage units, each employing a slurry containing active metal particles and an electrolyte solution as a rechargeable electrical energy storage medium, the electrical power storage apparatus receiving electrical power from the electric utility and supplying electrical power to the electric utility, when required.

BRIEF DESCRIPTION OF THE DRAWINGS

The present invention will be understood and appreciated more fully from the following detailed description, taken in conjunction with the drawings in which:

FIGS. 6A–6D are schematic illustrations of stages in the replacement of discharged slurry with charged slurry;

FIG. 12 is a general schematic illustration of an electric vehicle employing the multi-cell rechargeable battery of FIG. 1;

FIGS. 15A, 15B and 15C are respective side, top and end view schematic illustrations of the vehicle of FIG. 14, illustrating the general location of major operating systems therein;

FIG. 29 is a block diagram illustrating the principal functional components of the battery of FIG. 28.

DETAILED DESCRIPTION OF THE INVENTION

Figure 1:
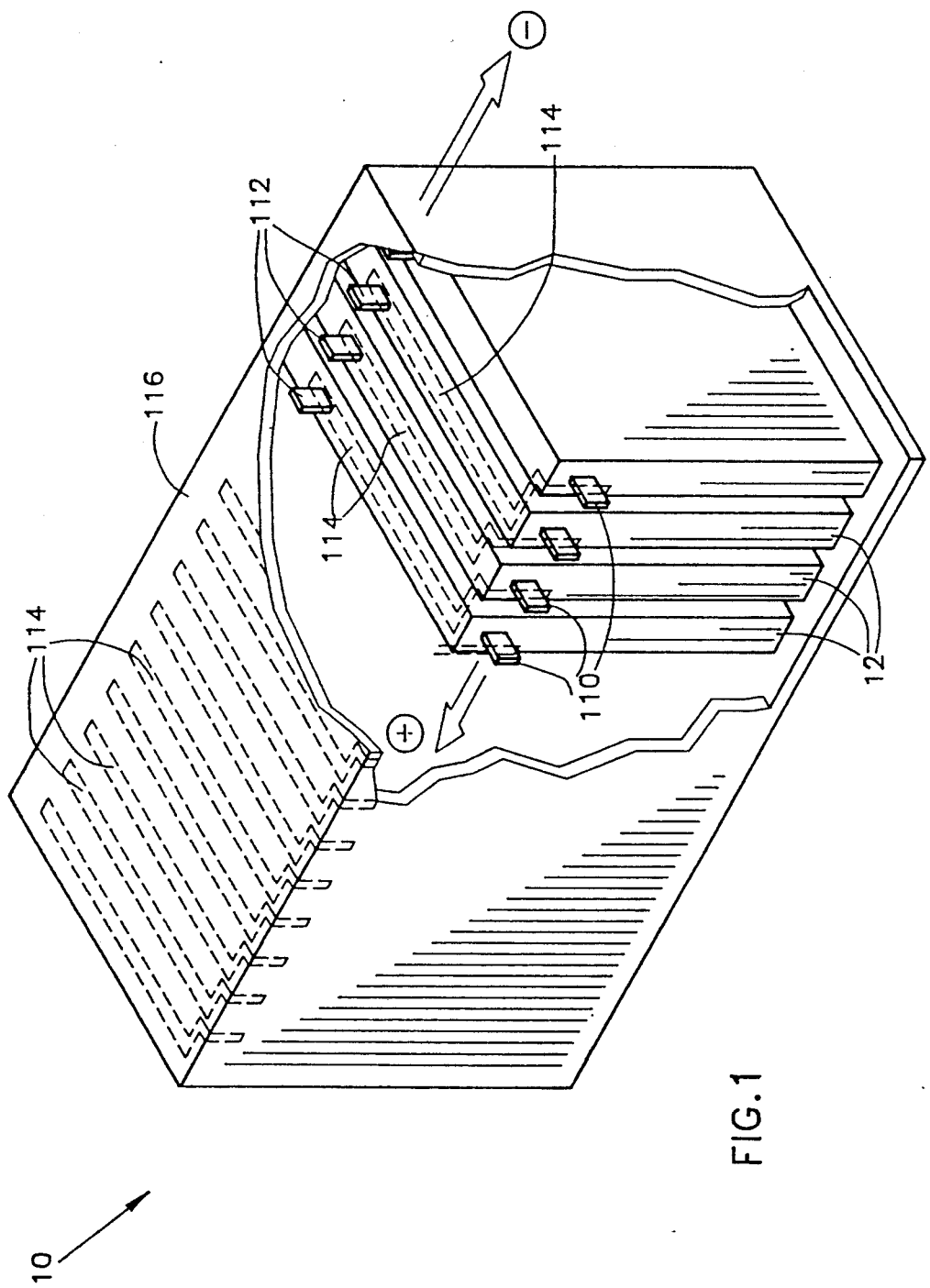
FIG. 1 is a schematic illustration of a multi-cell metal-air battery suitable for use in electric vehicles.

Referring briefly to FIG. 1, there is shown a multi-cell, rechargeable, metal-gas battery 10, containing a slurry of active metal particles and an electrolyte solution, and which is suitable for powering an electric vehicle, such as shown and described below in conjunction with FIGS. 12-15C. Battery 10 includes a stack of serially-connected electrical cells 12.

The series connection of the cells is facilitated by means of positive and negative terminals, respectively referenced 110 and 112, the positive and negative terminals of adjacent cells being interconnected, as shown, via electrically conductive pathways, referenced 114, shown in FIG. 1 in hidden detail. Typically, pathways 114 are built-in to the battery housing, referenced 116.

Figure 2:
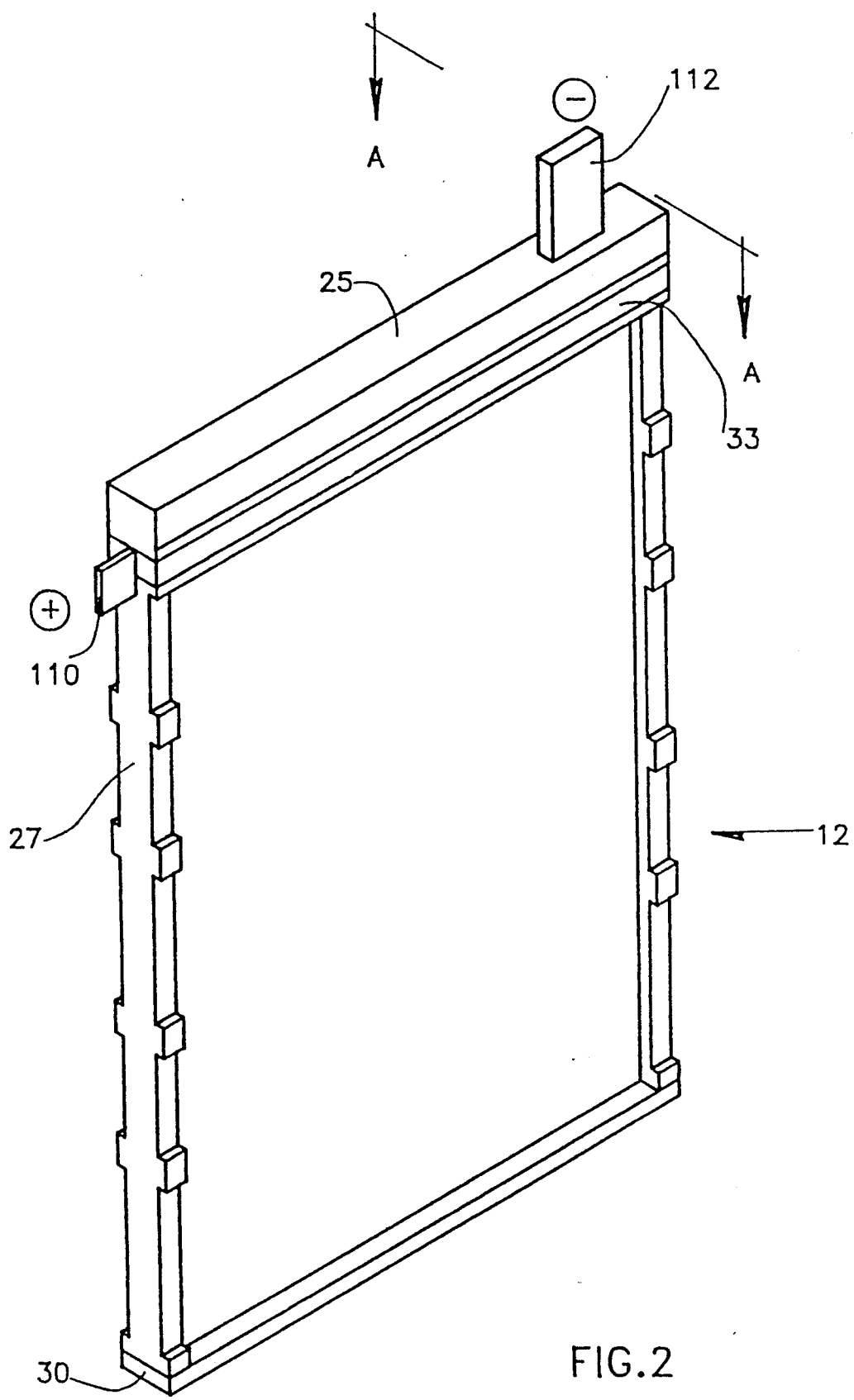
FIG. 2 is a pictorial illustration of a single cell of the multi-cell battery illustrated in FIG. 1.

FIG. 2 is a pictorial representation of a single battery cell, referenced generally 12, whose construction is described in detail hereinbelow.

Typically, battery 10 is specifically a zinc-air battery employing a slurry containing a mixture of zinc particles and a suitable electrolyte solution, such as alkaline potassium hydroxide.

Figure 3:
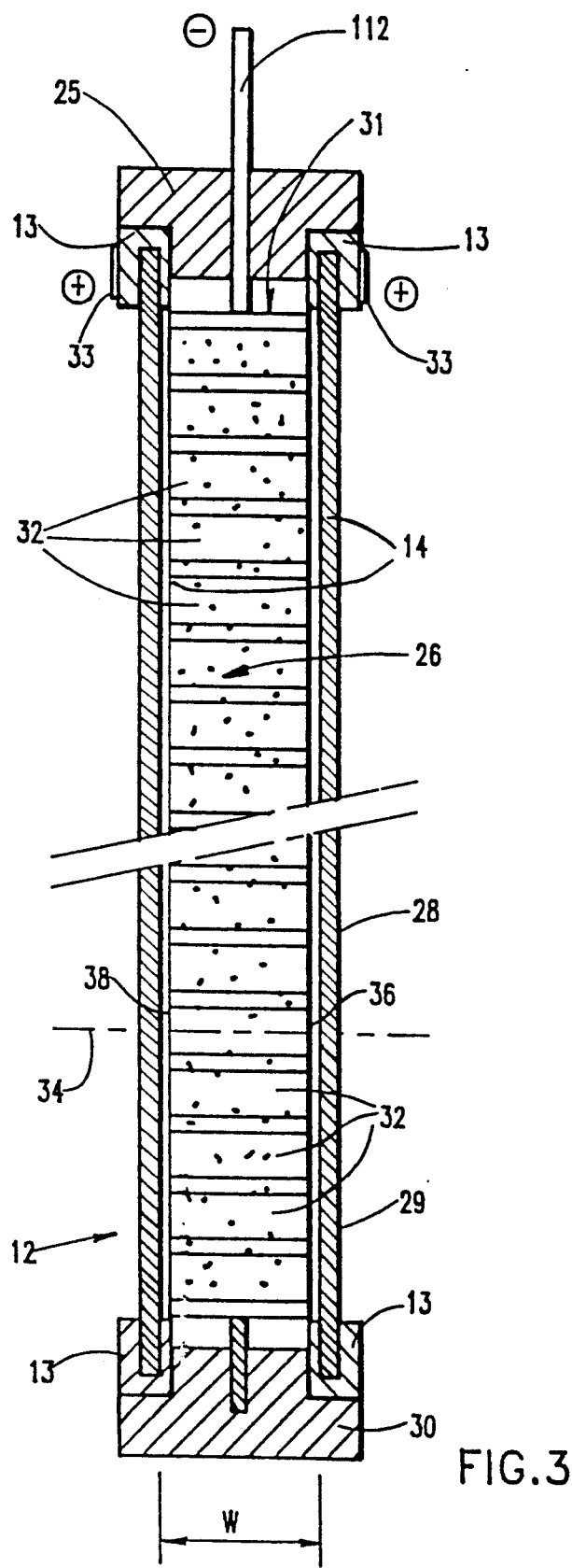
FIG. 3 is a cross-sectional view of the battery cell illustrated in FIG. 2, taken along line A—A therein, and wherein the central current collector is constructed in accordance with one embodiment of the invention.
Figure 4:
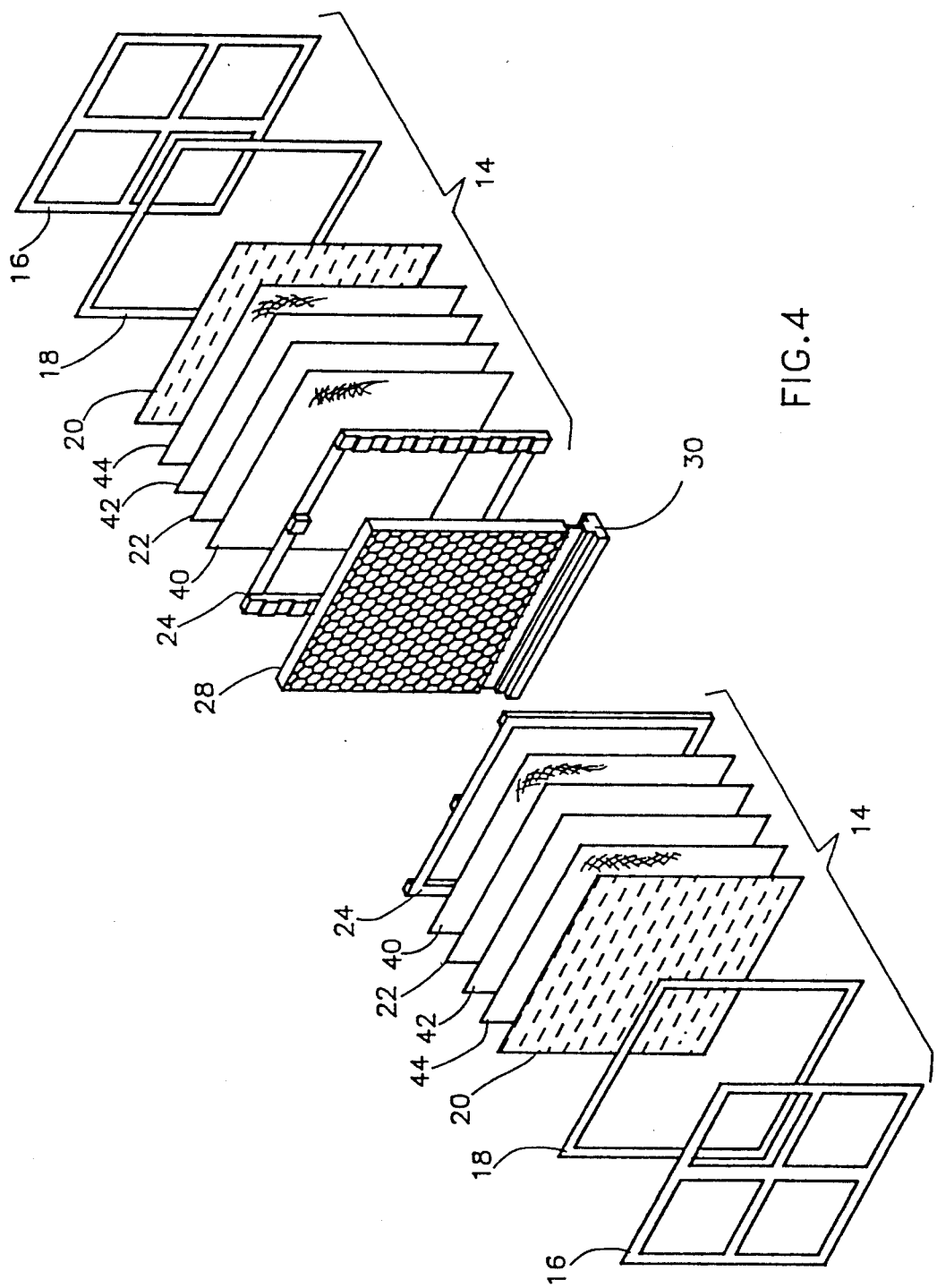
FIG. 4 is an exploded view illustration of the single battery cell illustrated in FIG. 2, constructed according to the embodiment of FIG. 3.

Referring now to FIGS. 3 and 4, there is illustrated a single battery cell 12, which includes a pair of frame members 13 (FIG. 3), typically formed of polypropylene, each supporting an associated outer electrode unit 14.

Referring now more particularly to FIG. 4, each outer electrode unit includes an outer support frame 16, typically formed of polypropylene; an outer current collector 18, typically formed of nickel mesh; a gas electrode 20, typically an air electrode formed of a wet-proofed, catalyzed carbon layer formed on the nickel mesh; a normal separator 22, formed typically of nonwoven porous nylon, for preventing contact between the metal particles in the slurry and the gas electrode; and an inner support frame 24, similar to outer support frame 16.

In assembled form, as illustrated in FIGS. 2 and 3, top and side sealing members, referenced respectively 25 and 27 (FIG. 2), cooperate with frame members 13 (FIG. 3) which support outer electrode units 14 so as to define an interior space, referenced generally 29 (FIG. 3), for storing a power storage slurry, such as described above, preferably in the form of a static bed of active metal particles saturated with a suitable electrolyte solution. The saturated static bed is indicated generally by reference numeral 26 (FIG. 3).

The active metal particles of the slurry are supported in the interior space 29 of the cell in a static bed saturated with the electrolyte solution.

A central current collector 28 is mounted within the interior space 29 of the battery cell so as to be surrounded by the saturated static bed. In the embodiments described below in conjunction with FIGS. 5 and 16-21, the central current collector is operative to support individual portions of the static bed. This has numerous advantages, as described hereinbelow in conjunction with FIG. 5.

Figure 5:
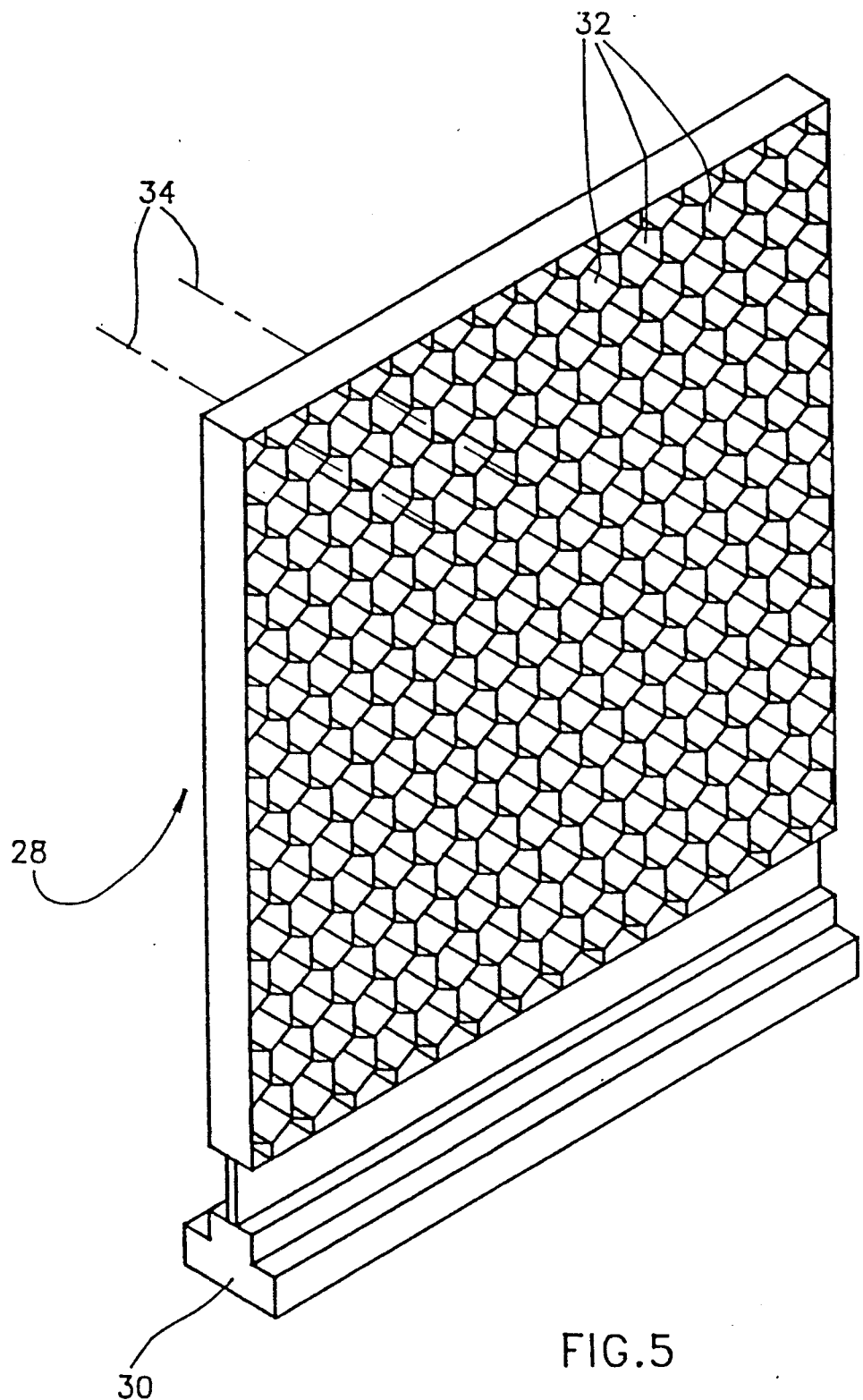
FIG. 5 is a schematic illustration of the central current collector employed in the battery cell of FIGS. 3 and 4.

Referring now also to FIG. 5, the central current collector 28 includes a base portion 30 by which the collector 28 may be removed from cell 12, so as to permit the replacement of electrically discharged slurry with an equivalent volume of charged slurry. Base portion 30 is also configured to fit together with frame members 13 so as to define a liquid-tight seal therewith. A method of slurry replacement, in which the central current collector 28 is removed and subsequently replaced, is shown and described below in detail in conjunction with FIGS. 6A-7.

As illustrated in FIG. 3, negative terminal 112, shown here in the form of a tab, is mounted within top sealing member 25 and is arranged so as to engage an adjacent electrical pathway 114 (FIG. 1). Terminal 112 protrudes downward into the interior space of the cell 12 such that when central current collector 28 is located therewithin, an upper portion 31 of the collector engages the terminal so as to define an electrical connection therewith.

Positive terminal 110 (FIG. 1) is connected to outer current collectors 18 (FIG. 4) by any suitable means, although typically via an electrically conductive band member 32 (FIGS. 2 and 3) suitably connected to outer current collectors 18.

According to the present embodiment, central current collector 28, which may be formed of any suitable material, such as copper, steel or nickel, optionally plated with lead, tin or cadmium, has a three-dimensional honeycomb-type structure. Central current collector 28 preferably defines an array of open-ended hollow volumes 32, each having an axis of symmetry 34 (FIGS. 3 and 5). Axis of symmetry 34 extends through opposing open ends, referenced 36 and 38, and intersects with outer electrode units 14 typically at an angle of 90°.

The length of each volume 32, as measured at right angles to the outer electrode units 14, is slightly less than the width W (FIG. 3) of the interior space 29 of the battery cell 12, such that the central current collector takes up virtually the entire interior space of the battery cell.

Figure 16:
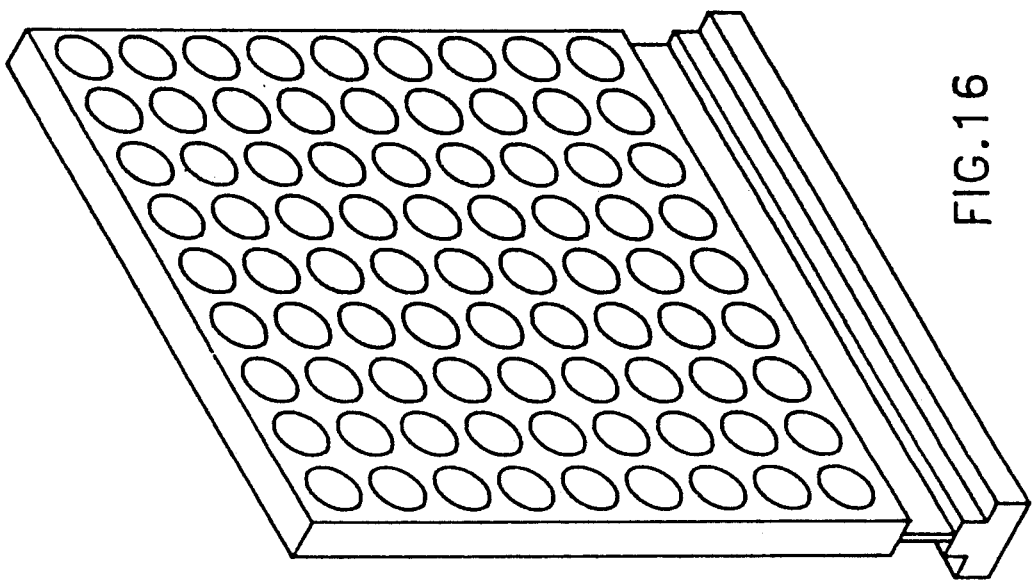
FIGS. 16, 17, 18 and 19 are perspective views of central current collectors constructed in accordance with further embodiments of the present invention.
Figure 17:
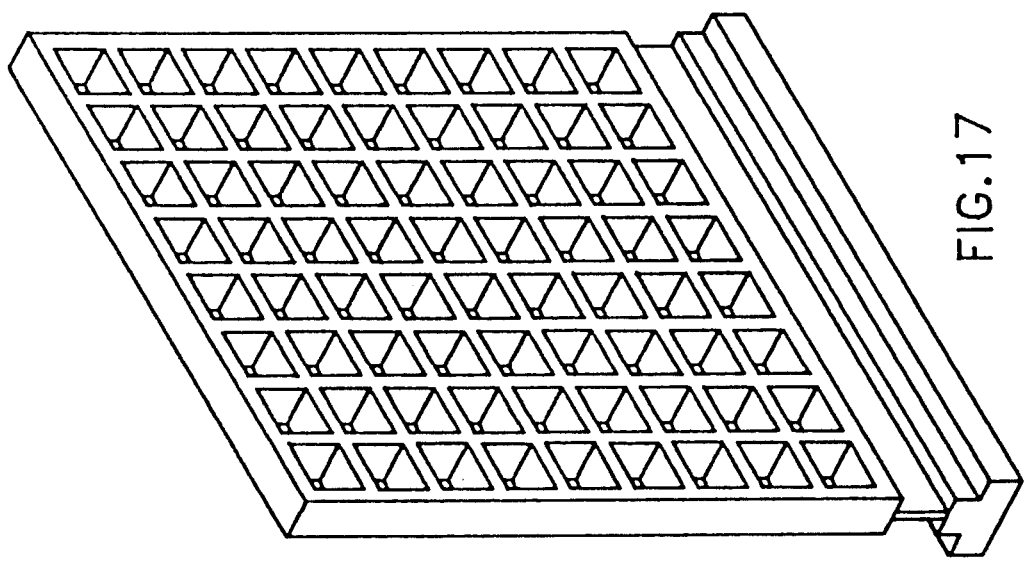
Figure 18:
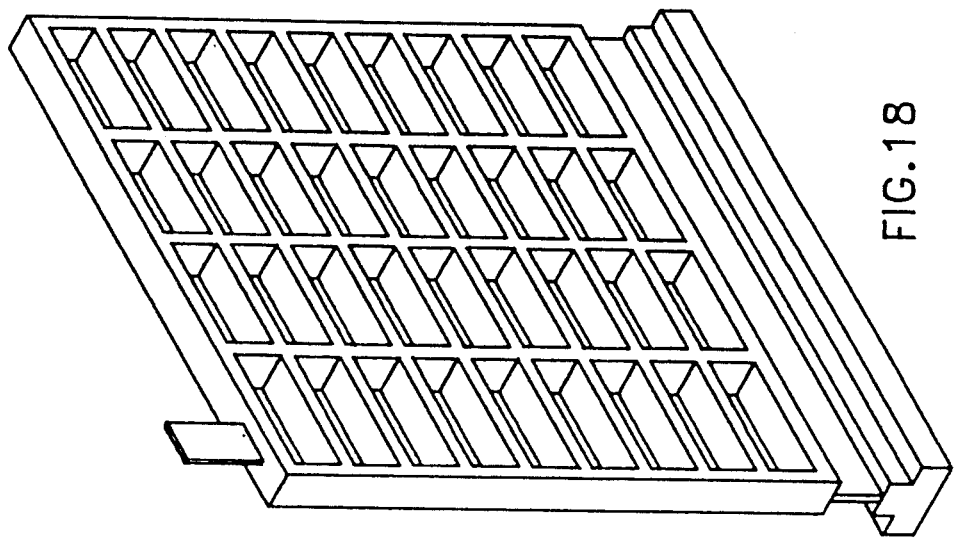
Figure 19:
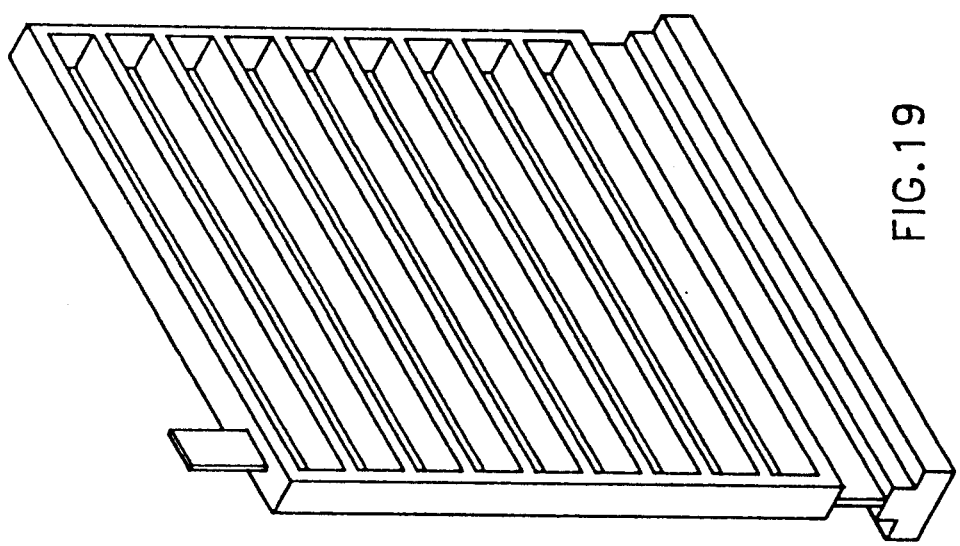

In the present example, volumes 32 are hexagonal. Although this geometric configuration has greater mechanical strength than honeycomb arrays of alternative configurations, it is not intended to exclude the use of volumes having non-hexagonal configurations. Some examples of alternative configurations are shown in FIGS. 16-18, which illustrate a central current collector having circular, square, and rectangular volumes respectively. FIG. 19 illustrates a central current collector having an overall 'ladder' construction, each rectangular volume thereof extending along the length of the cell.

Figure 20:
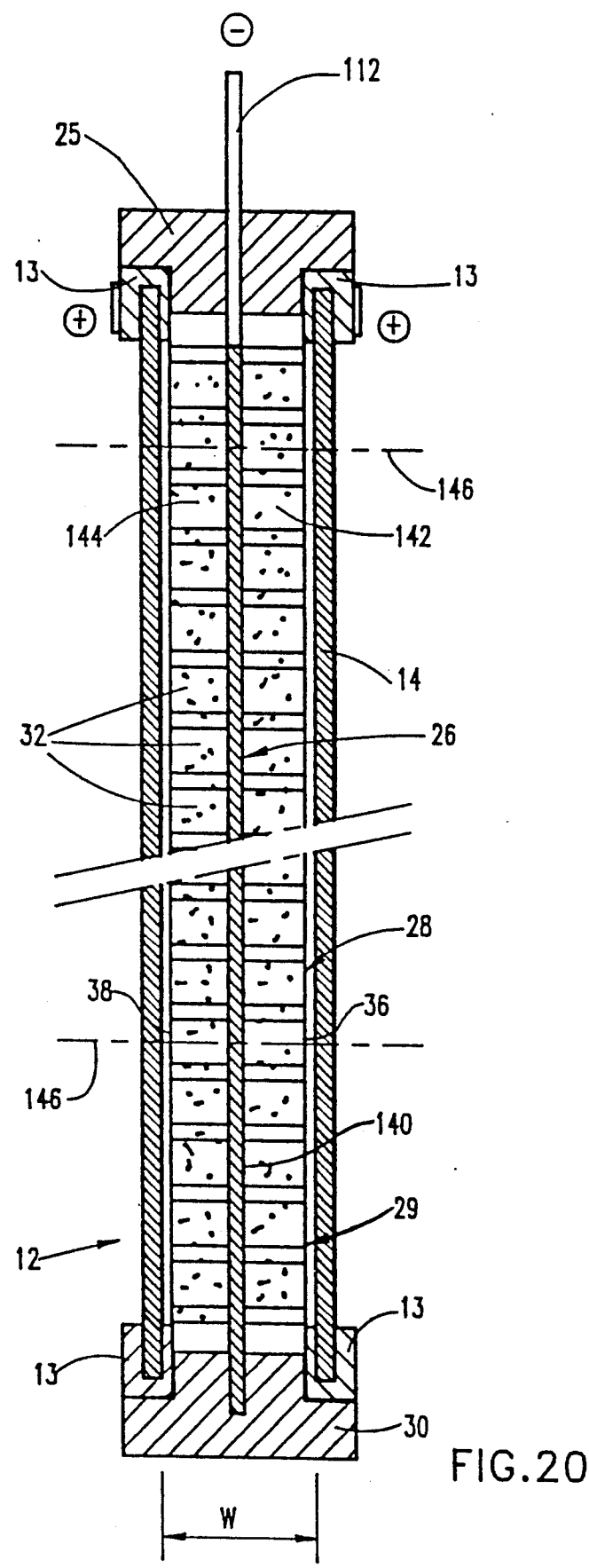
FIG. 20 is a cross-sectional view of the battery cell illustrated in FIG. 2, taken along line A—A therein, and employing a central current collector constructed in accordance with yet a further embodiment of the invention; i
Figure 21:
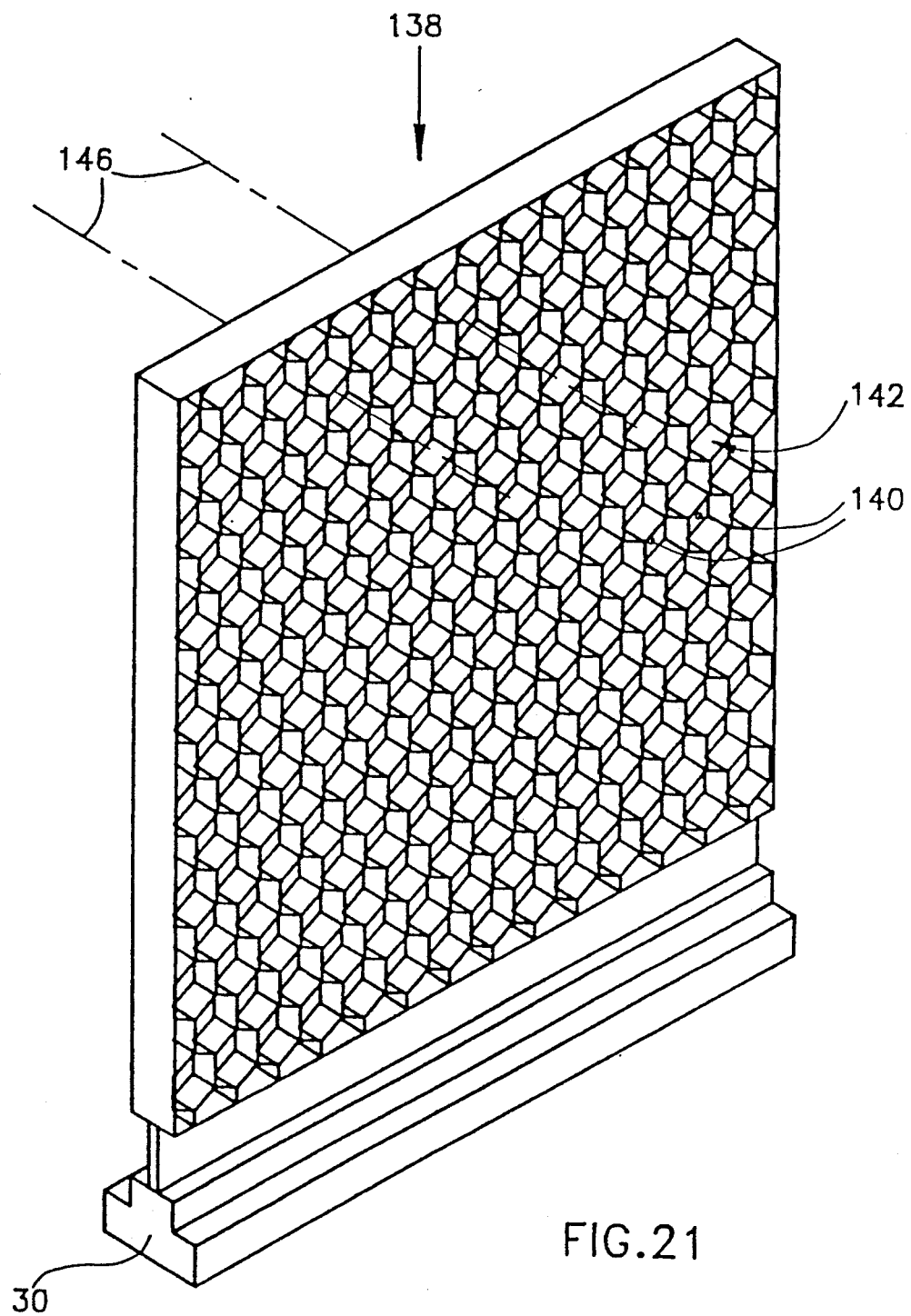
FIG. 21 is a perspective view of the central current collector illustrated in FIG. 20.

Referring briefly to FIG. 20, electrical cell 12 is shown to have a central current collector 138 which is similar to that illustrated in FIG. 5, but wherein each volume thereof is sub-divided by a wall element 140 into a pair of volumes 142 and 144 aligned along a common axis 146. A perspective view of central current collector 138 is shown in FIG. 21.

Among some advantages of the honeycomb or cellular configuration of the central current collector 28 are the following:

1. Power storage slurry is not required to be pumped into the battery cells as with some noncellular current collectors. Instead, as will be better understood from the description below of a method of slurry replacement, volumes 32 of the central current collector are filled by simply immersing it in a bath containing charged slurry, and allowing the charged slurry to flow into the volumes. Rapid subsequent reinsertion of the central current collector into the battery cell ensures that the slurry in each of volumes 32 remains therein.

2. Obviating the need to pump slurry into the battery cells prevents unnecessary wear on the cells, in view of the fact that the outer electrode units 14 are not mechanically strong. Furthermore, inherent in pumping is the danger of the outer electrode units 14 of respective adjacent battery cells bowing, thereby touching and causing electrical shorting. Even if shorting does not occur, merely restricting the available space between adjacent battery cells for air flow reduces the performance of the battery.

3. As the slurry becomes electrically discharged, the active metal particles thereof dissolve and/or form a solid discharge product, as known in the art. The accumulation of relatively dense solid material, together with the loss of structural integrity of the bed of metal particles, causes the particulate material in the slurry bed to slump downwards. The distribution of the slurry bed between the array of volumes 32 provides localized, mechanical support to constituent volumes of the slurry bed so as to prevent wholesale slumping of the particulate material to the bottom of the battery cell, and thus avoids further mechanical stress on the cell.

Referring now once again to FIG. 4, each outer electrode unit 14 preferably includes an 'inner' protective layer 40 arranged between normal separator 22 and central current collector 28. Typically, layer 40 is a plastic or metallic mesh which provides mechanical protection to the separator 22 upon removal and replacement of the central current collector 28. Typically, as described hereinabove, normal separator 22 is made of nonwoven porous nylon and, in the absence of protective layer 40, would thus be prone to excessive wear or even tearing after relatively short time.

An example of protective layer 40 is an extruded plastic netting, for example, product no. ON3330 having a strand thickness of 0.013 inches and an open area of 78%, manufactured by Conwed Plastics of Belgium, and marketed under the trademark Vexar (R).

According to a further embodiment of the invention, a selective separator, referenced 42, may also be provided between normal separator 22 and air electrode 20. The selective separator, which may be a microporous sheet material of, for example, polypropylene or polyethylene, is operative to prevent contact between the gas electrode 20 and dissolved metal species in the slurry. In the present example, therefore, the selective separator 42 is operative to prevent the dissolved zinc species $ZnO_2^=$ from travelling to the air electrode.

According to yet a further embodiment of the invention, an 'outer' protective layer 44, similar to the 'inner' protective layer 40, is provided between the air electrode 20 and the normal separator 22. When selective separator 42 is also present, the outer protective layer 44 is provided between air electrode 20 and selective separator 42. The outer protective layer 44 provides mechanical support to the separators 22 and 42 so as to prevent them from 'clinging' to the air electrode 20. This eases both the supply of air to the air electrode and also the irrigation of the slurry bed with distilled water or an electrolyte solution, such as by means described below in conjunction with FIG. 13.

Figure 6A:
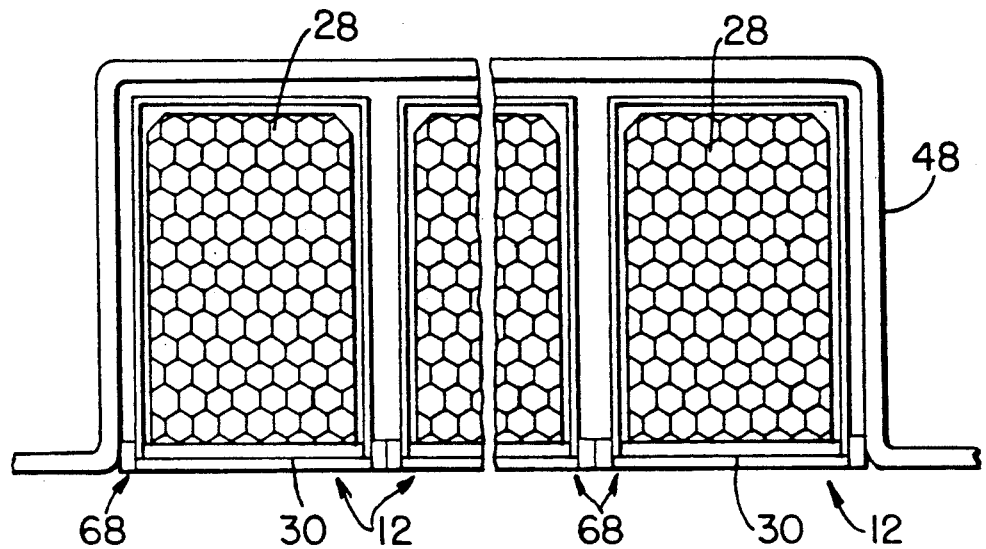
Figure 6B:
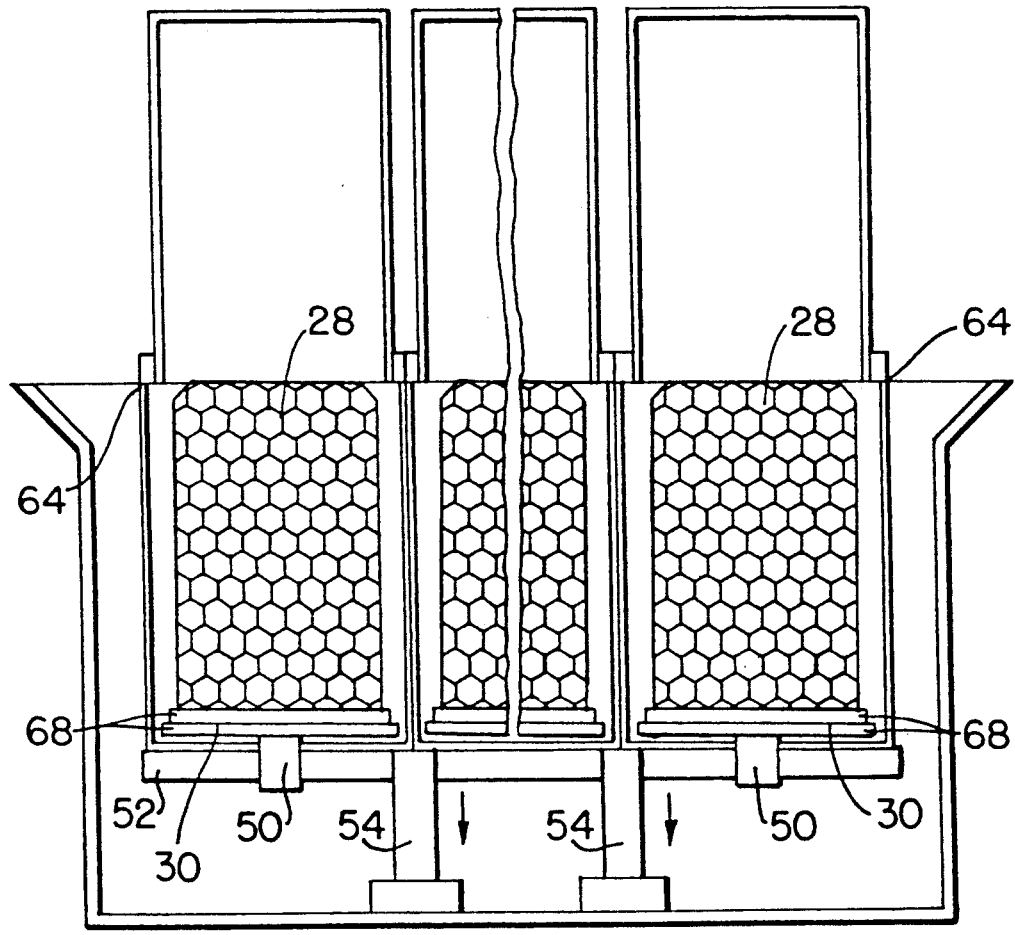
Figure 6D:
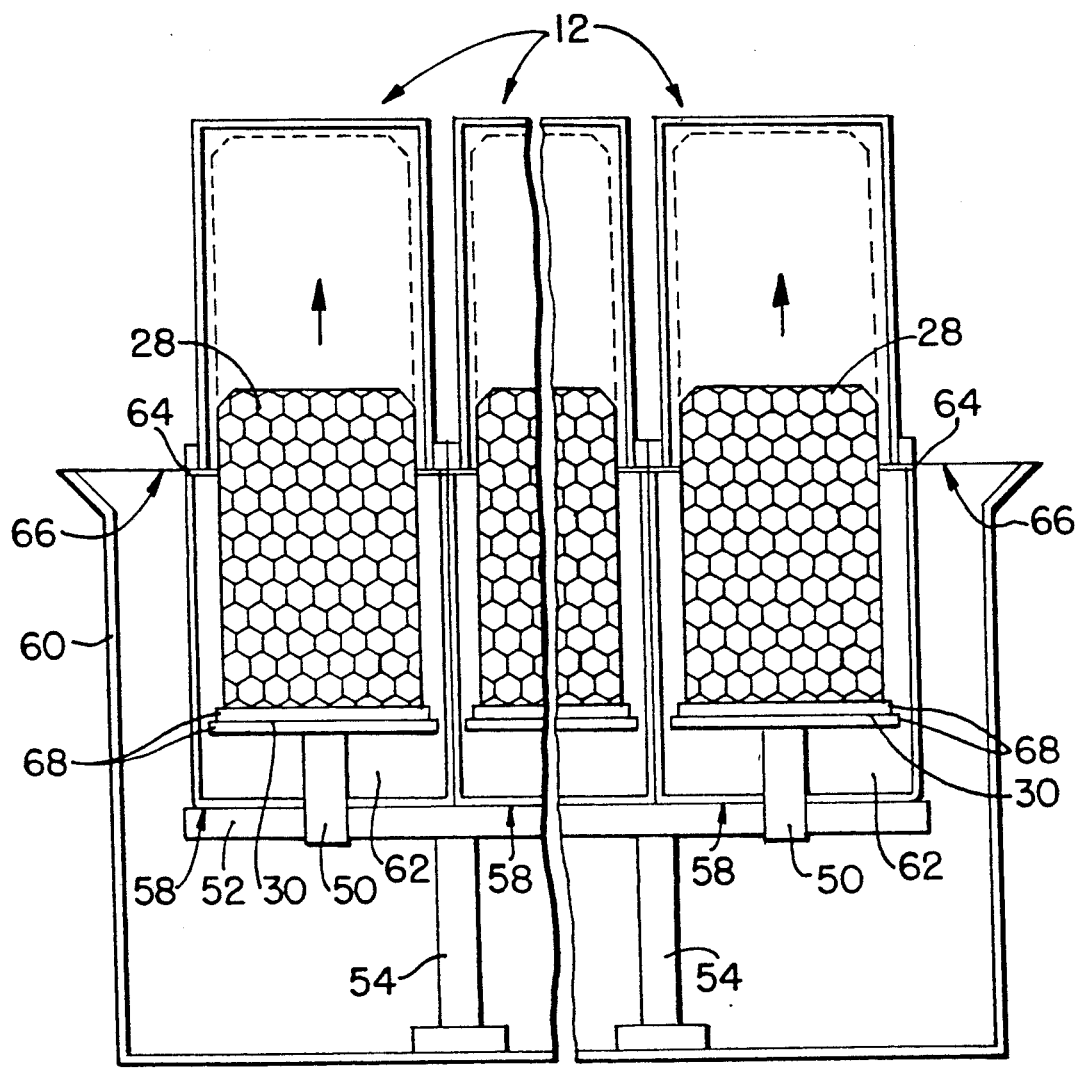
Figure 7:
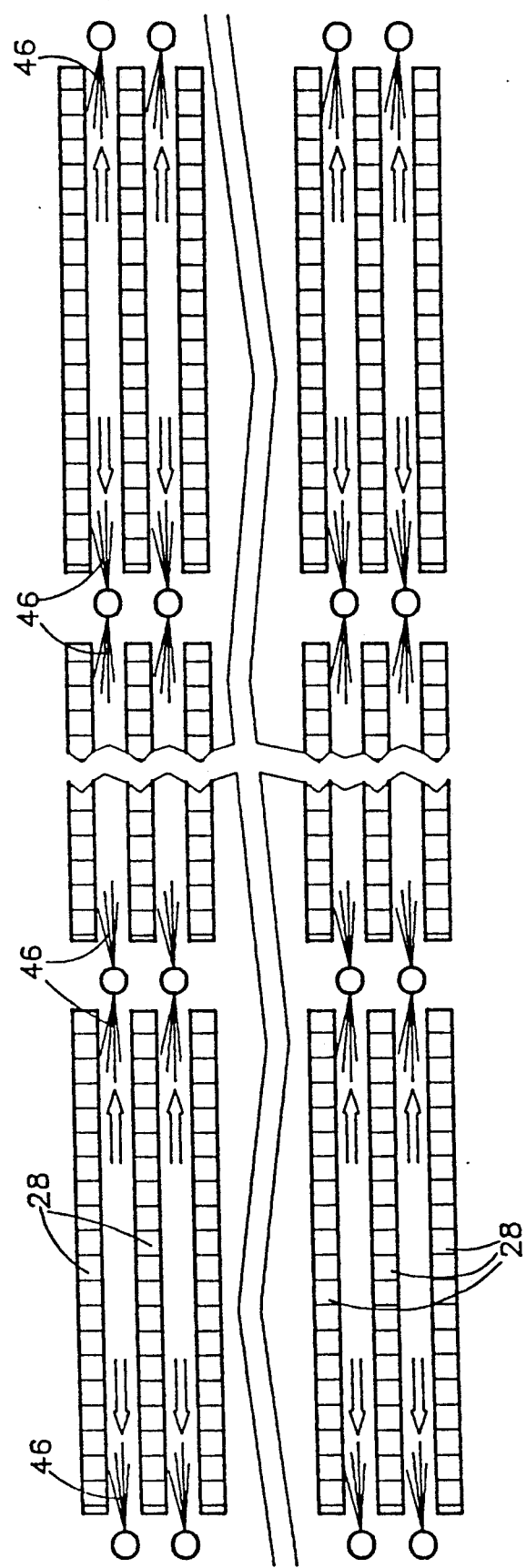
FIG. 7 is sectional illustration depicting the cleaning of discharged slurry from an array of central current collectors, taken in the direction of line 7—7 in FIG. 6C.

Referring now to FIGS. 6A-7, a process of removing discharged slurry from a multi-cell battery arrangement mounted in a housing 48 of one of the battery banks 120 or 122 of the body of a vehicle, such as shown and described above in conjunction with FIGS. 14–15C, and subsequent cleaning and filling of each of the battery cells, is described below, in accordance with a preferred embodiment of the invention. Typically, this will be carried out at a filling station facility, such as shown and described below in conjunction with FIG. 24.

A first stage is to withdraw the central current collector 28 from each cell 12 via the central current collector base portion 30. According to one embodiment, the base portions 30 of each of the individual cells are joined or integrally formed so as to constitute a single base member, thereby facilitating the removal of all of the central current collectors simultaneously.

Referring now particularly to FIG. 6B, base portions 30 of the respective central collectors 28 are secured via first reversible actuator means 50 to a platform element 52. The platform element 52 is mounted onto second reversible actuator means 54, thereby permitting removal of the central current collectors from a plurality of battery cells simultaneously. As the bulk of the slurry is located within the array of volumes 32, removal of the central current collectors causes simultaneous removal of the vast majority of the discharged slurry contained thereby.

Depending on the viscosity of the discharged slurry, some of it may remain on the battery cell walls and on the central current collectors 28 as they are withdrawn from the battery cells. Accordingly, as illustrated schematically in FIGS. 6C and 7, jets 46 of a fluid, typically water, KOH or air, are directed between the central current collectors so as to flush the slurry therefrom. Fluid jets may also be directed upward into the cells 12 so as to wash any residual discharged slurry therefrom.

Reference is now made to FIG. 6D, in which is illustrated the step of refilling of the cells with charged slurry. A platform element 52 supports a plurality of central current collectors 28, as shown, and has mounted thereon a plurality of baths 58. Platform element 52 is typically positioned on the floor of a housing 60 via second reversible actuator means 54.

Initially, the baths 58 are filled with a volume of charged slurry 62 containing sufficient slurry for the refilling of cells 12. In the present embodiment, wherein the central current collectors have a cellular configuration, the baths are filled to a depth such that the entire plurality of volumes 32 of the central current collectors become immersed in charged slurry so as to become filled therewith.

Subsequently, second actuator means 54 are operated so as to displace the platform element 52 upwardly toward the cells 12, until sealing gaskets 64, located on the edges of baths 58 engage a lower surface 66 of the battery bank so as to define a seal therewith. Subsequently, first actuator means 50 are operated so as to displace central current collectors 28 towards battery cells 12.

In an embodiment wherein the central current collectors do not have a cellular configuration, such as shown and described below in conjunction with FIGS. 9–11, as the central current collectors are displaced upwardly into the cells, the current collector base portions, which are submerged in a volume of charged slurry, apply a generally upward pressure on an adjacent volume of the charged slurry in the baths, thereby forcing the slurry upward into the cells.

Figure 8:
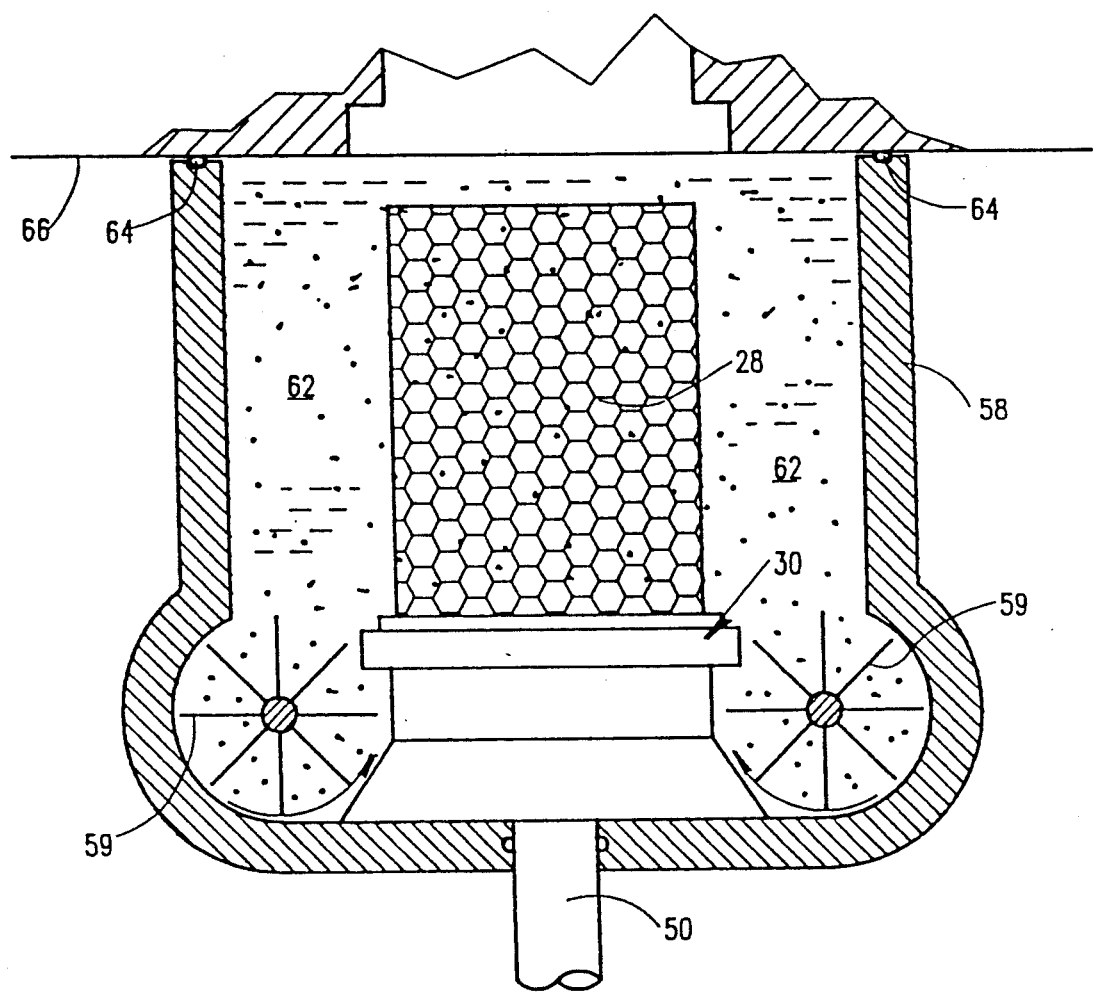
FIG. 8 is a schematic illustration of a detail of the apparatus illustrated in FIG. 6D, constructed in accordance with an alternative embodiment of the invention.

Reference is now made to FIG. 8, in which is illustrated a single bath 58, which is similar to baths 58 (FIG. 6D), except that stirrers 59 are employed so as to cause circulation of the slurry within the bath. The circulation of the slurry in this manner aids the filling of each of the individual volumes 32 of the central current collector 28. This is especially advantageous when the slurry has a relatively high viscosity.

It will be appreciated that although the described circulation is shown, in the present example, to be caused by stirrers, this is for example, only, and it may alternatively be caused by any other suitable means for vibrating or agitating the slurry.

Referring once more to FIG. 6D, baths 58 are sealed to lower surface 66 of the battery banks by means of gaskets 64 while the central current collectors 28 are reinserted, together with a fresh batch of charged slurry, into their respective cells 12. Preferably, there are also provided sealing means 68 so as to prevent leakage of slurry from cells 12 once the central current collectors 28 have been replaced therein. Suitable sealing means may be rubber gaskets, such as O-rings.

Figure 9:
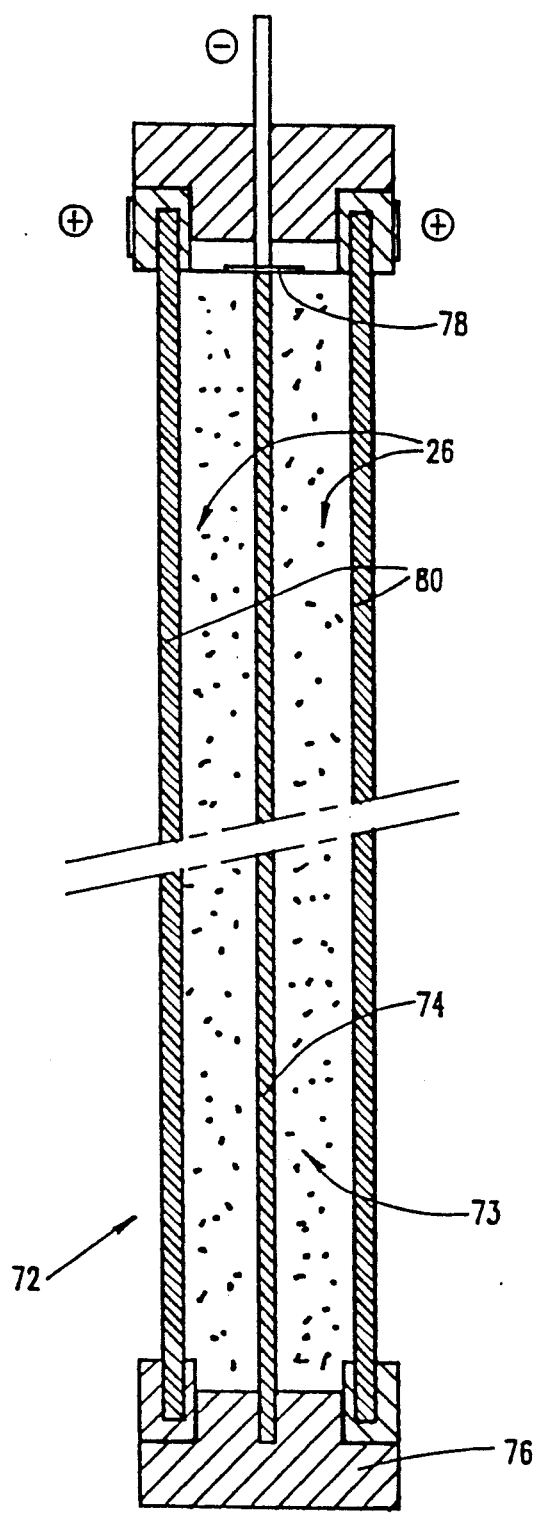
FIG. 9 is a cross-sectional view of the battery cell illustrated in FIG. 2, taken along line A—A therein, and wherein the central current collector is constructed in accordance with an alternative embodiment of the invention.
Figure 10:
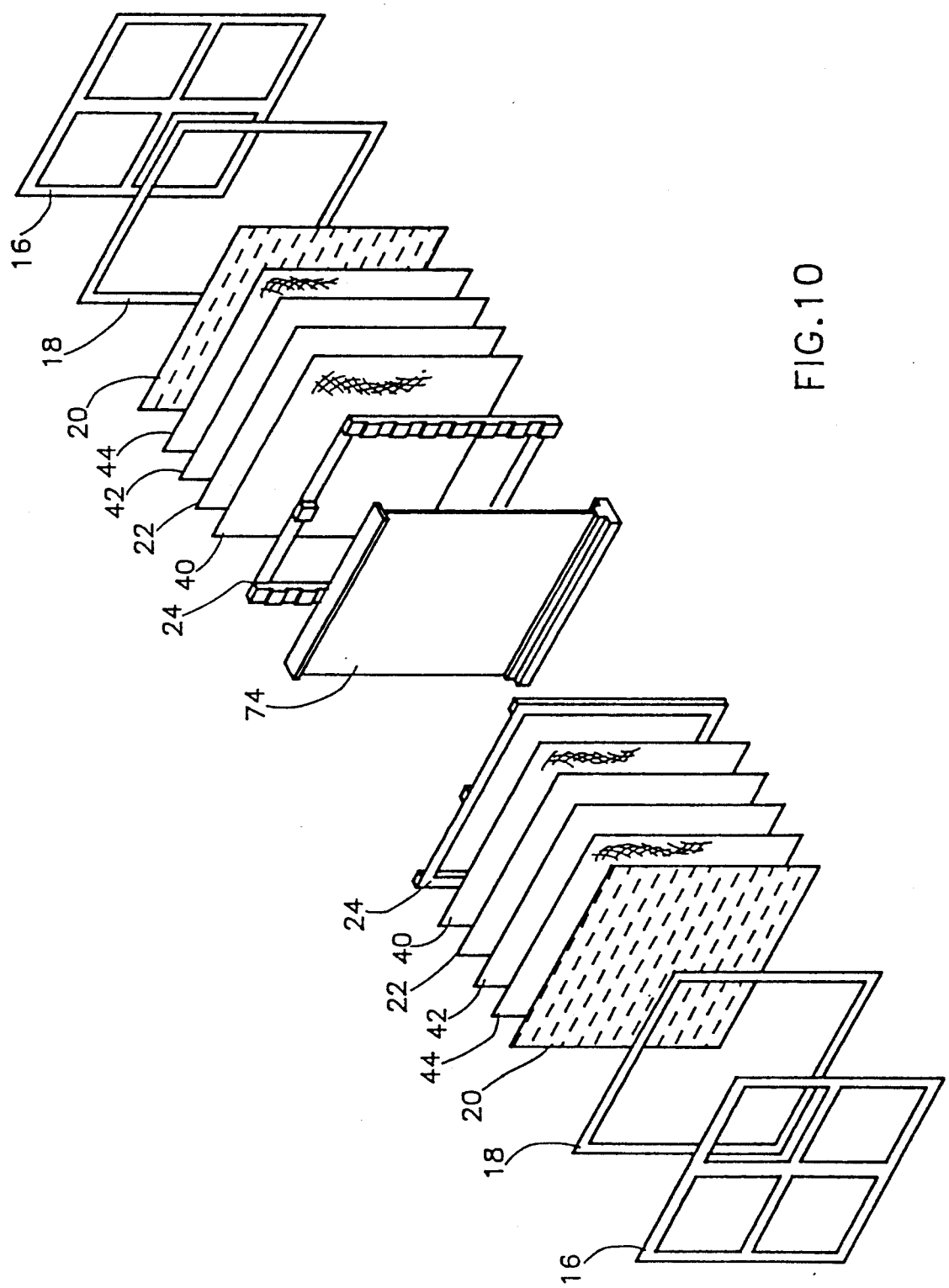
FIG. 10 is an exploded view illustration of the single battery cell illustrated in FIG. 9.
Figure 11:
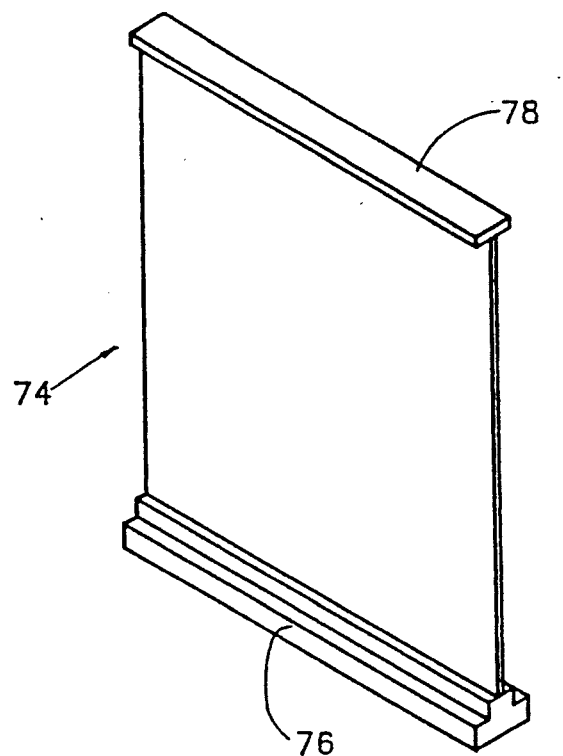
FIG. 11 is a schematic illustration of the central current collector employed in the battery cell of FIGS. 9 and 10.

Referring now to FIG. 9, there is illustrated a battery cell, referenced generally 72, which is similar to battery cell 12, (FIGS. 2–4), except that the central current collector 74, shown also in FIG. 10, has a generally T-shaped cross-sectional configuration, rather than the cellular configuration of central current collector 28 shown and described above in conjunction with FIGS. 2–5.

Central current collector 74 includes a base portion 76 located at a bottom end thereof, and a slurry removal element 78 located at a top end thereof. In the embodiment of FIG. 9, slurry is contained within an interior space 73 of cell 72 between the outer electrode units 80 and between the removal element 78 and the base portion 76 of the central current collector 74. The various elements of outer electrode units 80 are similar to those shown and described above in conjunction with FIG. 4 and are identified by similar reference numerals and are not, therefore, described again in detail herein.

According to the illustrated embodiment, removal element 78 is a relatively rigid flange member attached to the top end of central current collector 74 such that when the central current collector is removed from the cell 72, element 78 is operative to directly engage and thus displace the bulk of the slurry contained within the interior of the cell to the exterior. It will thus be appreciated that the slurry removal apparatus of the present embodiment is equally effective with a relatively viscous slurry as with a nonviscous slurry.

The method of removing discharged slurry from a multicell battery arrangement constructed according to the present embodiment and mounted in a housing 48 (FIG. 6A) of one of the battery banks 120 or 122 of the body of a vehicle, such as shown and described below in conjunction with FIGS. 14–15C, and the subsequent cleaning and filling of each of the battery cells, is similar to the method described above in conjunction with FIGS. 6A–7. For purposes of conciseness, the method is not described again in detail herein.

Reference is now made to FIG. 12, which illustrates a typical electric car 99, including a zinc air battery 100, similar to the multi-cell battery 10 (FIG. 1). The car 99 and battery 100 are preferably constructed so as to facilitate the replacement of spent slurry with charged slurry at the battery recharging subsystem shown and described below in conjunction with FIG. 24.

Figure 13:
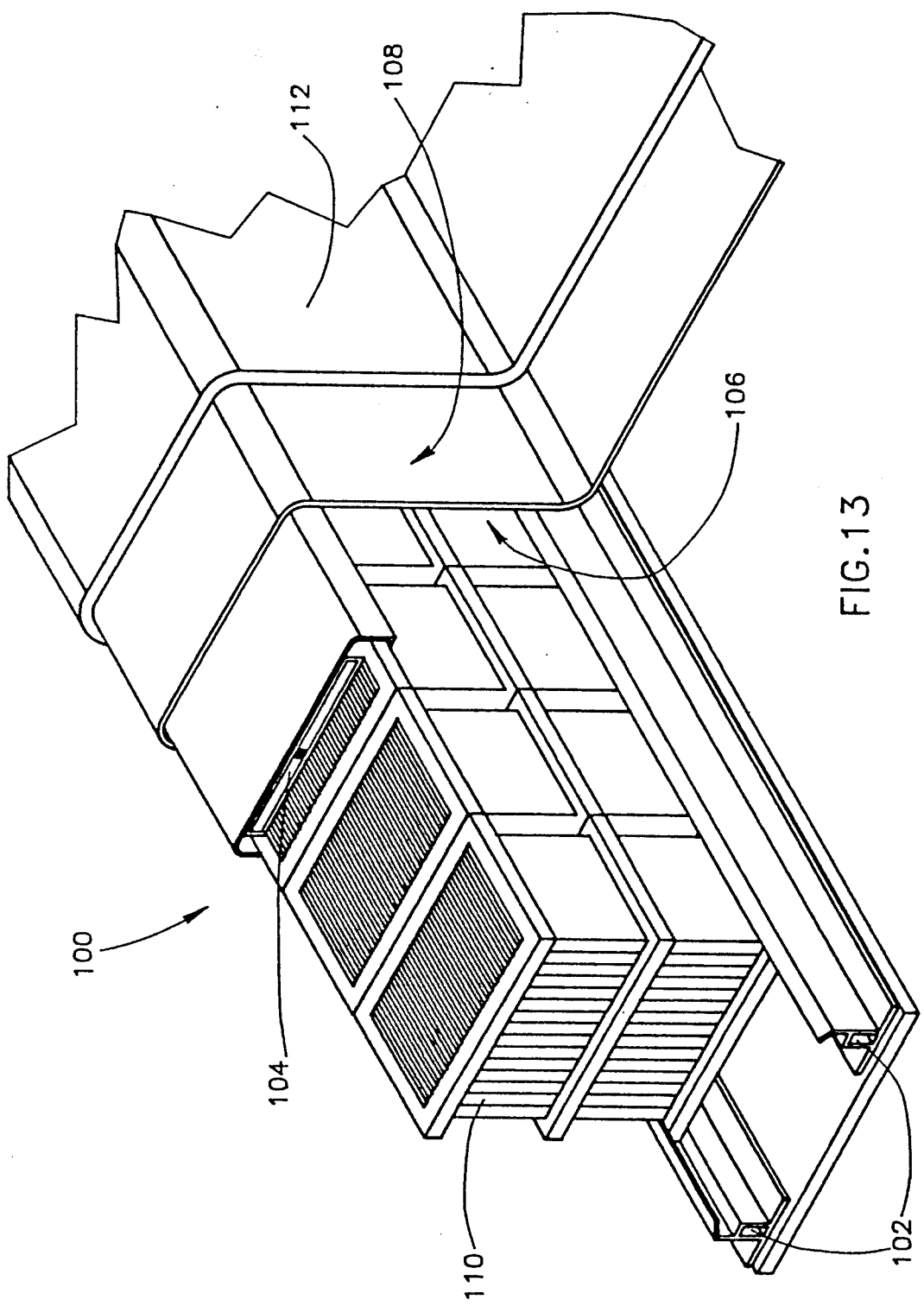
FIG. 13 is a partially cut away illustration of the installation of a zinc-air battery in a vehicle of the type illustrated in FIG. 12.

Referring now also to FIG. 13, the zinc-air battery 100 is typically located centrally along the longitudinal axis of the car 99 (FIG. 12) and is mounted on frame rails 102. Provision is made for distilled water and electrolyte supply tubes 104 and a scrubbed air flow channel 106 within an air tight enclosure 108, which surrounds the battery cells 110. As will be appreciated by persons skilled in the art, the supply of distilled water and/or electrolyte solution to the slurry is required, inter alia, so as to prevent it drying out. Enclosure 108 is typically covered by thermal and acoustic insulation 112. The structure of the individual battery cells is substantially as described above in conjunction with any of FIGS. 1–5 and 8–11.

Figure 14:
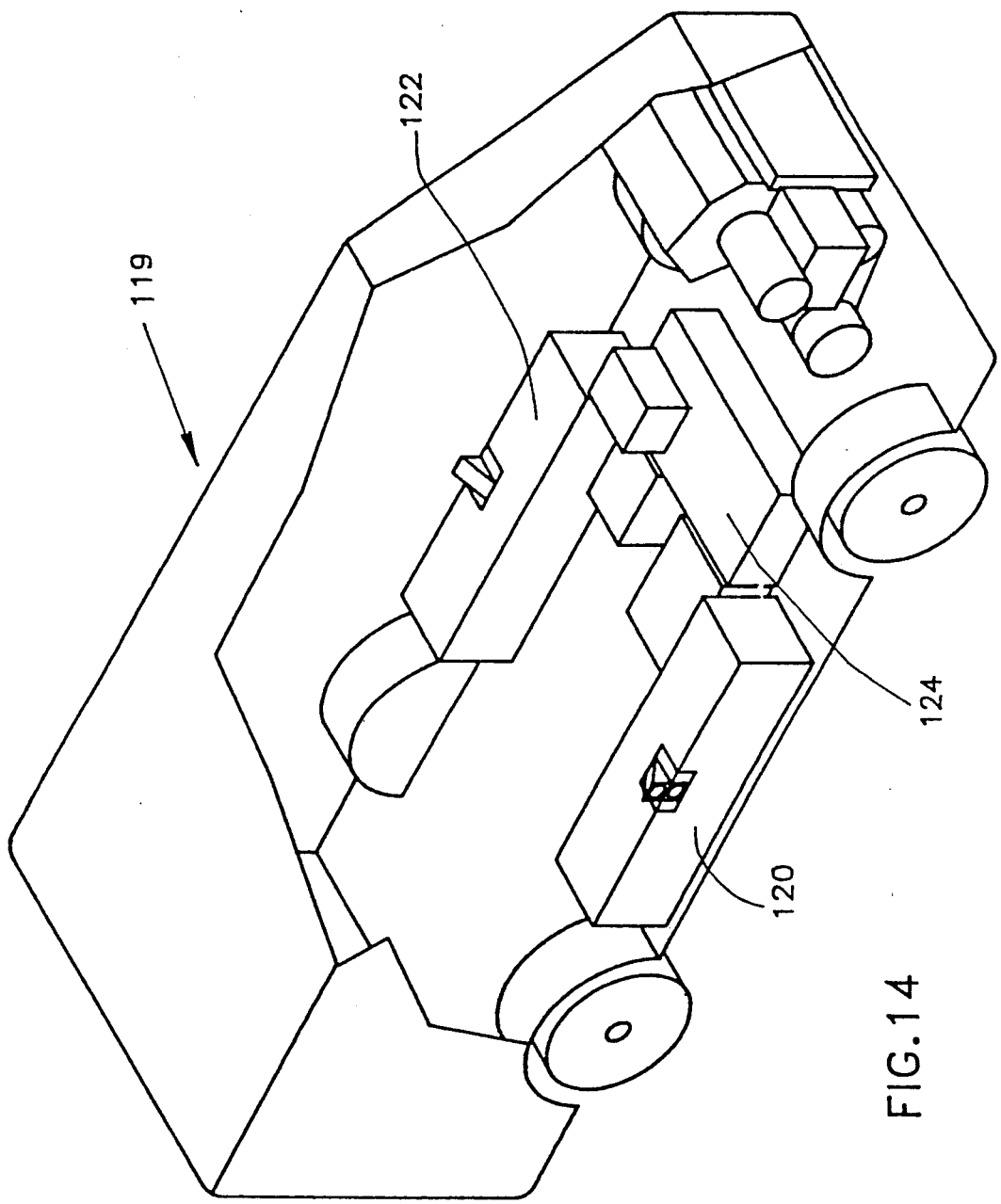
FIG. 14 is a general schematic illustration of an electric vehicle, different to that of FIG. 12, also employing the multi-cell rechargeable battery of FIG. 1.

Reference is now made to FIGS. 14–15C which illustrate the general configuration of an electric van 119 useful in the present invention. As seen in FIG. 14, the van is provided with two zinc-air battery banks 120 and 122 on opposite sides of the body. The van 119 and battery banks 120 and 122 are preferably constructed so as to facilitate the replacement of spent slurry with charged slurry at the battery recharging subsystem shown and described below in conjunction with FIG. 24. An auxiliary lead-acid battery 124 is preferably provided in addition. A power switching system 126 (FIG. 15B) governs the supply of power to and from the various batteries.

FIGS. 15A–15C also illustrate preferred locations of a 12 volt vehicle auxiliary battery 128, a traction motor and drive 130 (FIG. 15B), a cabin heater 132, and a Driving Management System 134.

Figure 22:
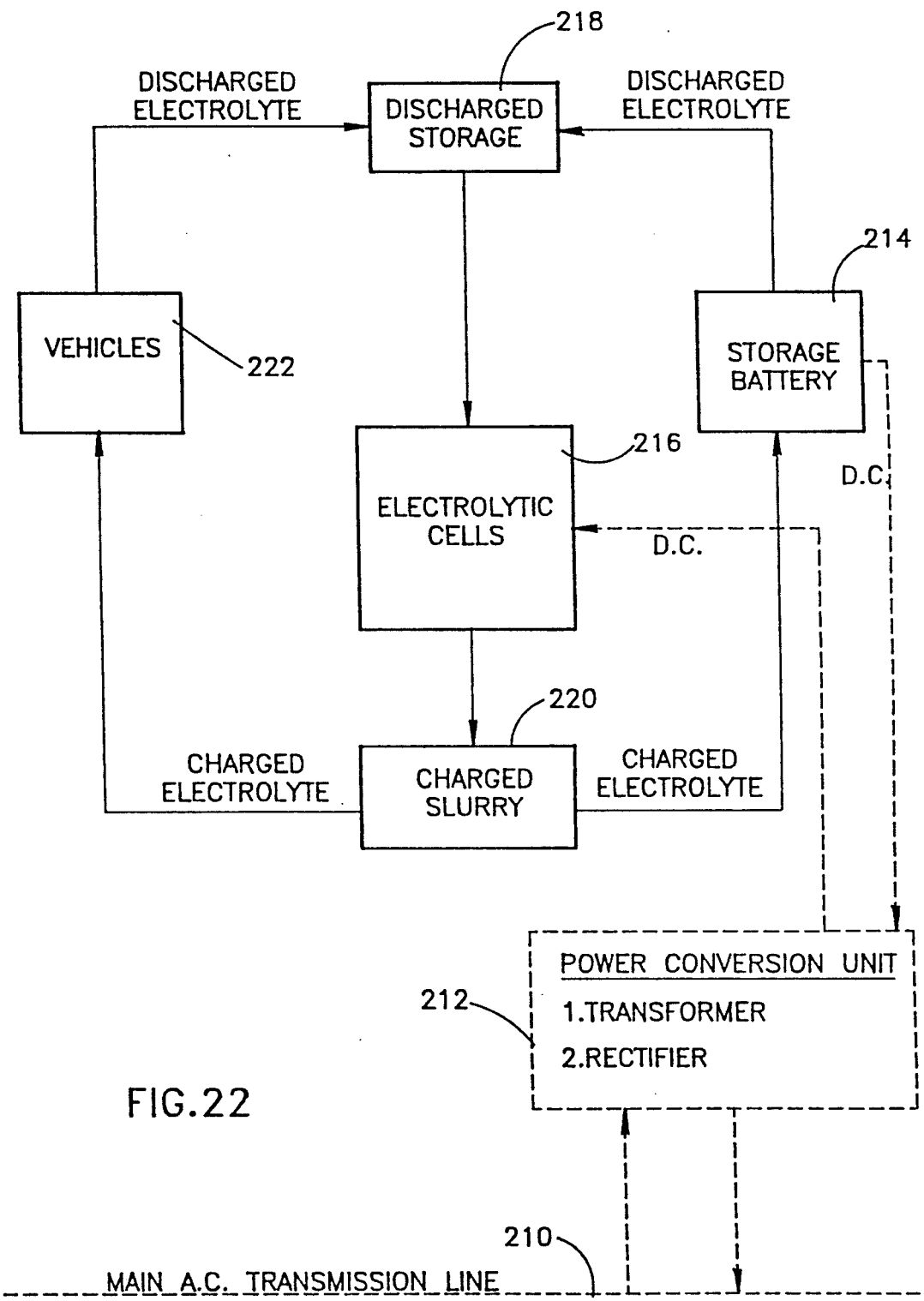
FIG. 22 is a block diagram illustration of an electrical energy system constructed and operative in accordance with a further embodiment of the present invention.

Reference is now made to FIG. 22, which illustrates in generalized block diagram form an electrical system constructed and operative in accordance with a further embodiment of the present invention and including an electrical utility having electricity generation apparatus and distribution lines, and electric power storage apparatus receiving electrical power from the electric utility and supplying electrical power to the electric utility when required.

According to a further embodiment, there is also provided a plurality of electric vehicles, such as shown and described above in conjunction with FIGS. 12–15C, and the electrical power storage apparatus is also operative to supply electrical power to the vehicles, when required.

Illustrated in FIG. 22 is an AC transmission line 210 which is arranged for power transfer via a power conversion unit 212 with a storage battery bank 214 and with a bank of electrolytic cells 216. The electrolytic cells 216 are operative to electrically charge an energy storage slurry, similar to that employed by cells 12 (FIGS. 1–4), such as a mixture of zinc granules and alkaline potassium hydroxide solution, thereby storing energy therein.

In the illustrated embodiment, discharged slurry is stored in a discharged slurry storage facility 218 and supplied to electrolytic cells 216 via suitable pumps (not shown). The charged slurry is received in a facility 220 and then stored in storage battery 214 or supplied to electric vehicles 222.

Discharged slurry is received at facility 218 from the electric vehicles 222 and from storage battery 214. The storage battery 214 provides, when necessary or economical, electrical power to transmission line 210 via conversion unit 212.

It will be appreciated by persons skilled in the art that the present invention, through the synergistic combination of two disparate activities, utility energy storage and electric vehicle operation, each of which is presently uneconomical, provides economical electrical utility off-peak power storage, surge protection, on-peak and super-peak demand power supply, spinning reserve and electric vehicle system.

Figure 23:
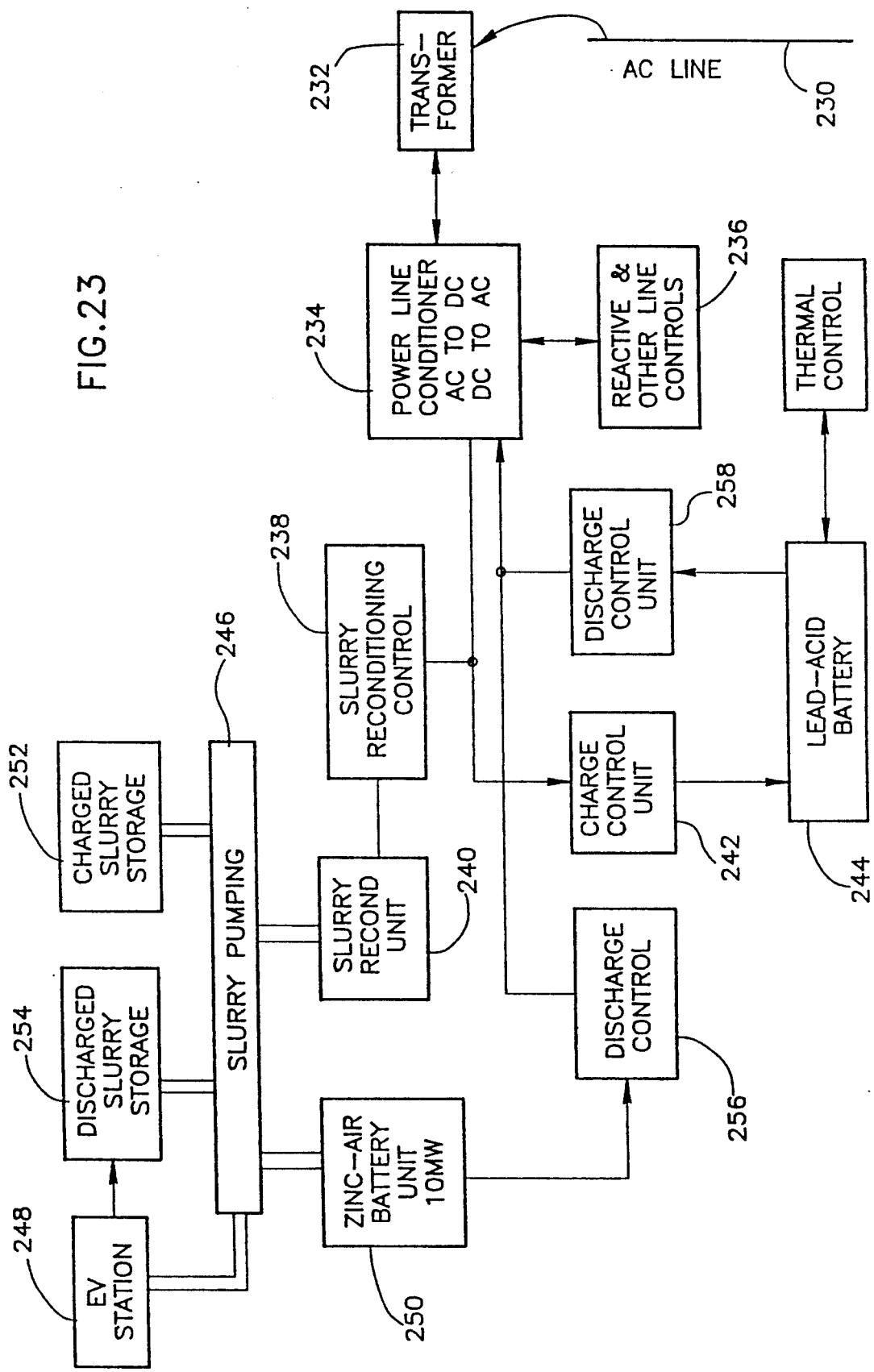
FIG. 23 is a more detailed block diagram of the system of FIG. 22.

Reference is now made to FIG. 23, which illustrates the system of FIG. 22 in greater detail. As shown in FIG. 23, the AC utility transmission line, here indicated by reference numeral 230, is coupled via a transformer 232 to a power line conditioner 234 which includes high capacity AC to DC and DC to AC converters. Reactive and other line control apparatus 236, such as peak switching-in detectors may be associated with the power line conditioner 234.

A DC output of conditioner 234 may be supplied via a slurry reconditioning control circuitry 238 to a slurry reconditioning facility 240. The DC output of conditioner 234 may also be supplied via a charge control unit 242 to a bank of lead acid batteries 244.

Slurry reconditioning facility 240 is operative to provide charged slurry, via slurry pumping apparatus 246 to an electric vehicle refueling station 248, for supply to electric vehicles. Facility 240 is also operative to supply charged slurry via slurry pumping apparatus 246 to a zinc air battery 250. Charged slurry from facility 240 may also be stored in a charged slurry storage tank 252.

Discharged slurry removed from electric vehicles is supplied from electric vehicle refueling station 248 to a discharged slurry storage tank 254 and is supplied at appropriate times to facility 240 by slurry pumping apparatus 246. Normally, recharging of slurry is carried out by facility 240 during off-peak times for utility supplied electricity.

Electrical power may be drawn from battery 250 when needed, and supplied via discharge control circuitry 256, power line conditioner 234 and transformer 232 to the utility via power line 230. Normally, power is supplied to the utility from battery 250 at times of peak power consumption.

Electrical power may be drawn from battery 244 when needed, and supplied via discharge control circuitry 258, power line conditioner 234 and transformer 232 to the utility via power line 230. Normally, power transfers between battery 244 and utility power line 230 take place in order to balance the impedance of the power line 230, to absorb short term peaks and short-falls, typically having a time constant of less than one-half hour.

Figure 24:
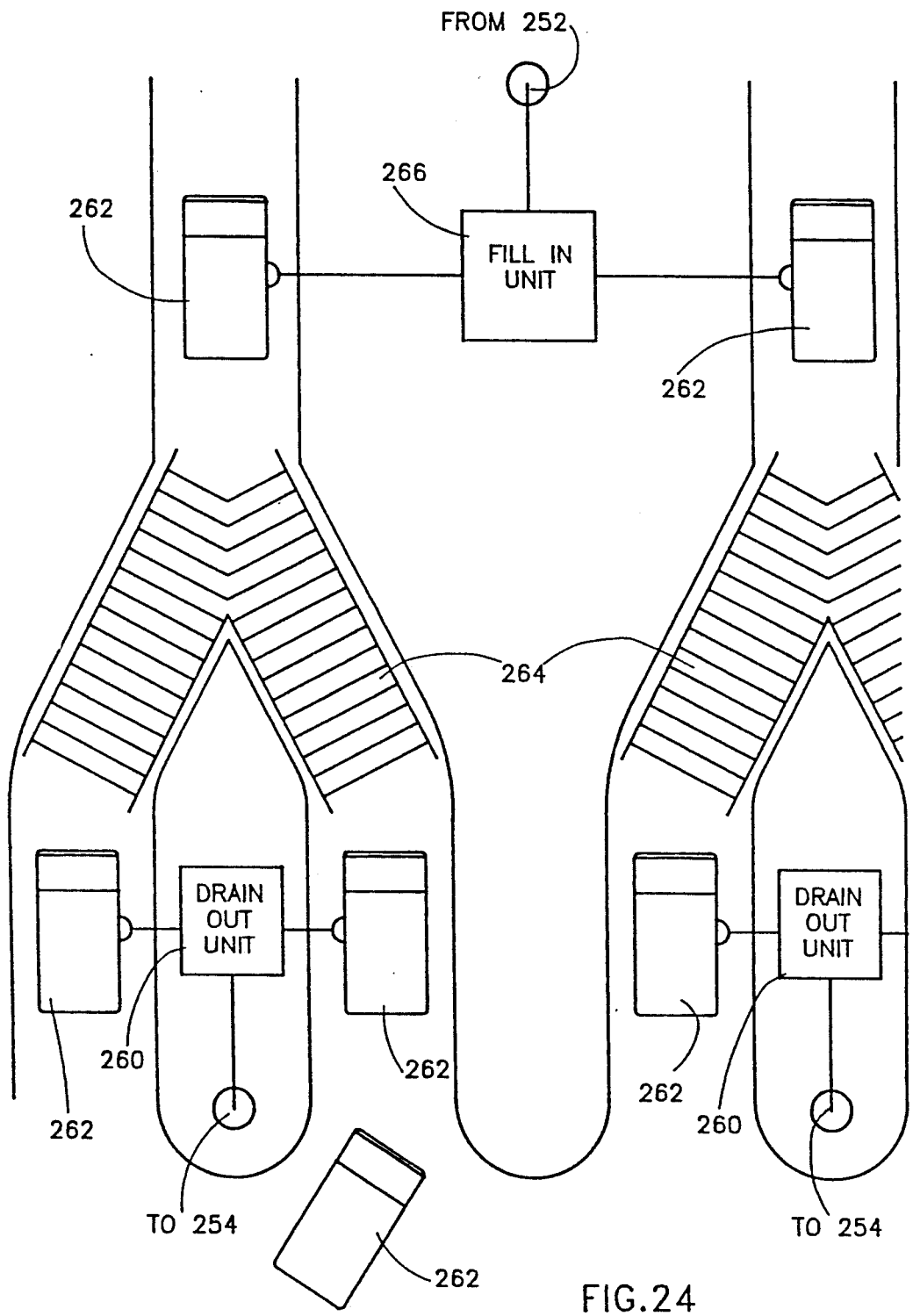
FIG. 24 is a schematic illustration of an electric vehicle battery recharging subsystem forming part of the system of FIGS. 22 and 23.

Reference is now made to FIG. 24, which is a pictorial illustration of an electric vehicle refueling station, such as station 248 (FIG. 23). As shown in FIG. 24, the refueling station includes a plurality of drain units 260 which are operative to remove discharged slurry from electric vehicles 262. The vehicles 262 are typically of the sort shown in and described above in conjunction with FIGS. 12-15C, and employing the electrical power storage system shown and described above in conjunction with FIGS. 1-4. The discharged slurry is supplied to discharged slurry storage tank 254 (FIG. 23).

Automatic moving platforms 264 may be provided for moving the electric vehicles 262 from the drain units 260 to charged slurry supply units 266, which supply charged slurry from charged slurry storage tank 252 to the electric vehicles 262.

Figure 25:
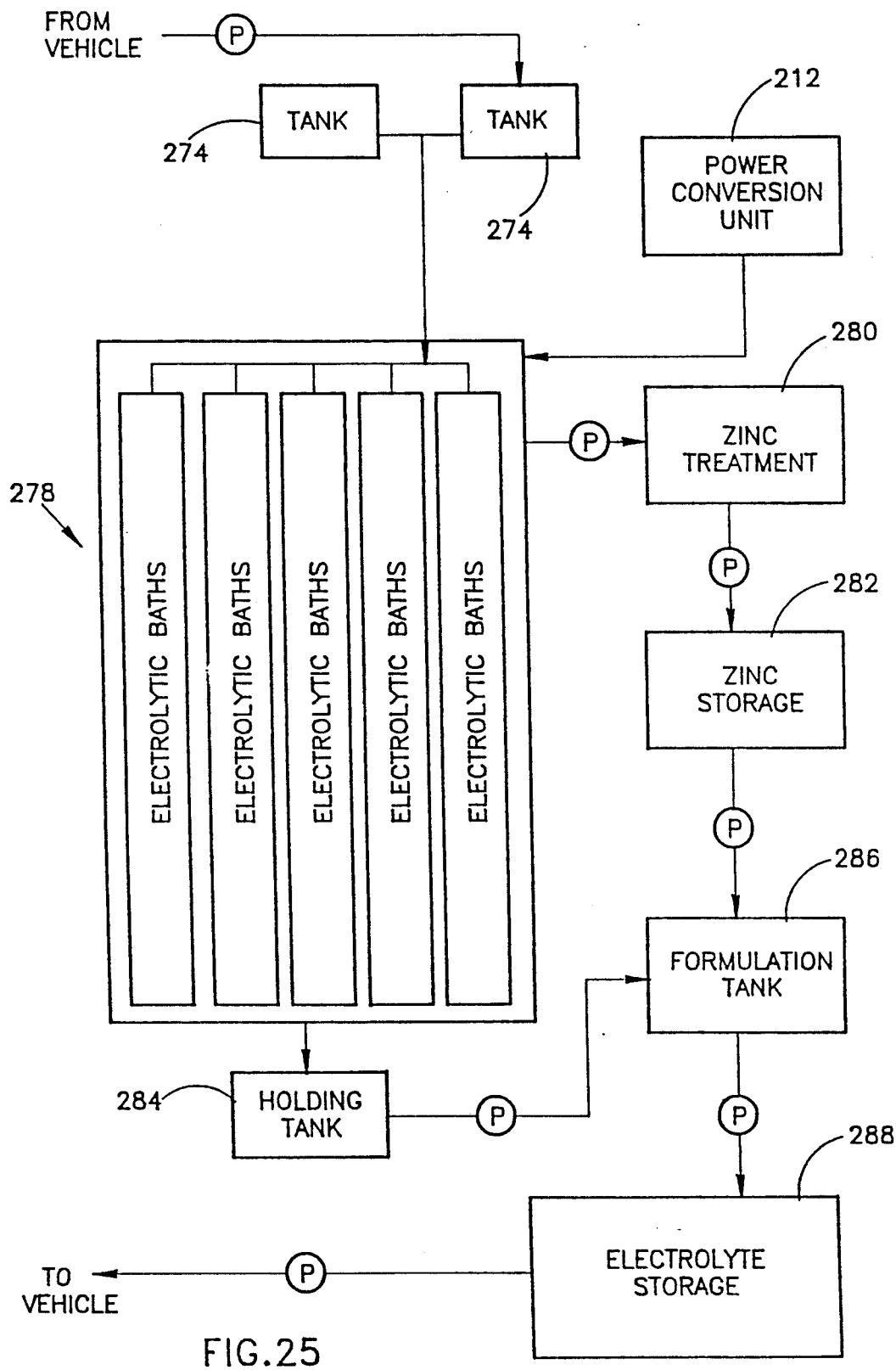
FIG. 25 is a pictorial block diagram of an electrolyte regeneration facility forming part of the system of FIG. 22 and 23.

Reference is now made to FIG. 25, which illustrates an electrolytic reprocessing subsystem, which is indicated generally by reference numeral 216 in FIG. 22. Discharged slurry, here of the composition: unreacted zinc granules, zinc oxide and alkaline potassium hydroxide solution, stored in tanks 274, is supplied to a bank of electrolytic baths 278, such as modified alkaline zinc plating baths with scrapers for periodically removing zinc deposits thereon. Baths 278 receive an electrical input from power conversion unit 212 (FIG. 22).

Freshly generated zinc mixed with alkaline potassium hydroxide solution is pumped from electrolytic baths 278 to a zinc treatment facility 280, such as a classifier for particle sizing, which provides a purified zinc output to a storage tank 282. KOH is received from electrolytic baths 278 and is supplied to a holding tank 284. The contents of tanks 282 and 284 are supplied to a formulation tank 286 in which they are combined to provide a recharged slurry. The recharged slurry is stored in a storage tank 288.

Figure 26:
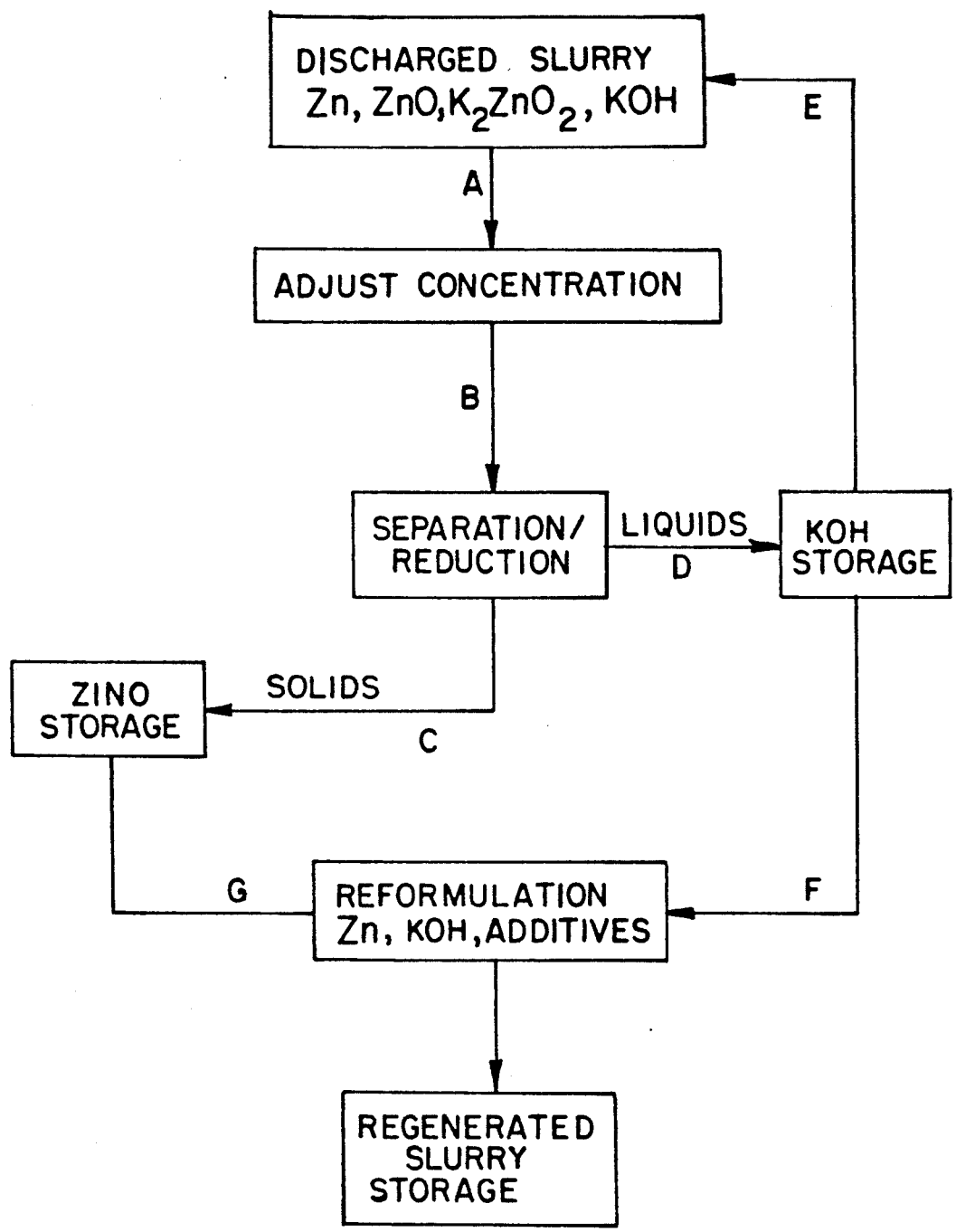
FIG. 26 is a flow chart of the operation of the regeneration facility of FIG. 25.

Reference is now made to FIG. 26, which describes the operation of the apparatus of FIG. 25. It is seen that the discharged electrolyte slurry containing Zn, ZnO, potassium zincate, water and KOH has its concentration adjusted by the addition of KOH. Subsequently, the discharged electrolyte having a predetermined concentration undergoes separation and reduction, the KOH being removed to a KOH storage tank such as tank 286 (FIG. 25) and the solids being supplied to a zinc storage facility, such as tank 282 (FIG. 25). The zinc is supplied to a reformulation facility such as tank 284 (FIG. 25) in which KOH and other additives are added to the zinc to provide a regenerated slurry which is stored as in tank 288 (FIG. 25).

Figure 28:
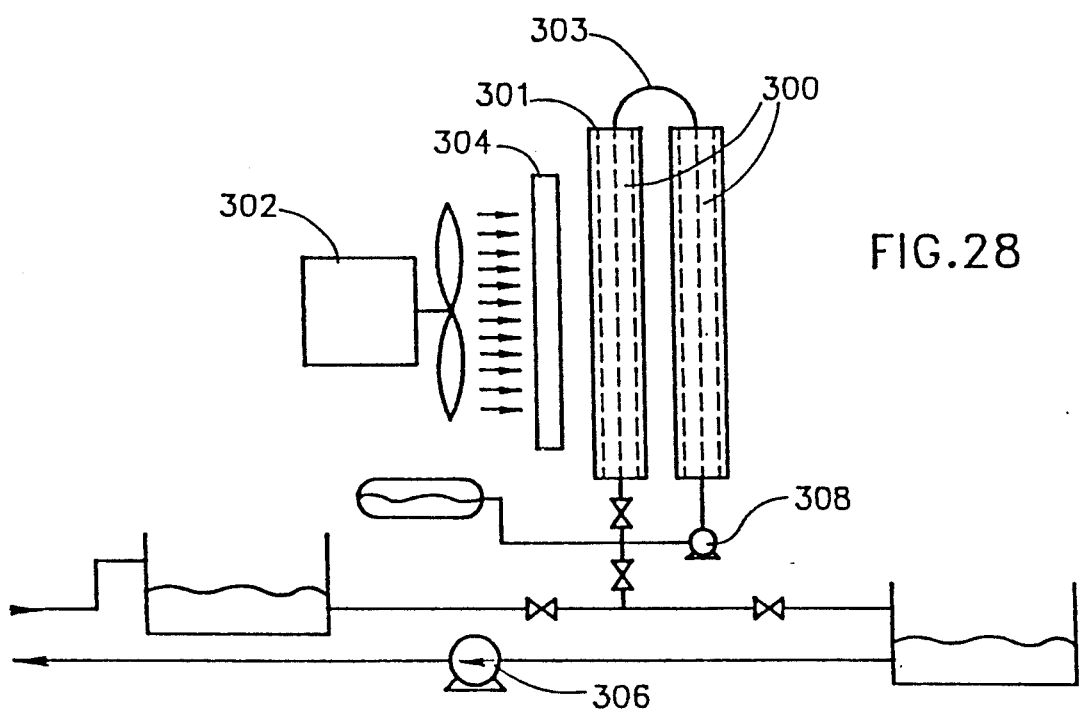
FIG. 28 is a schematic illustration of the connection of the battery of FIG. 27 in its operating environment.
Figure 27:
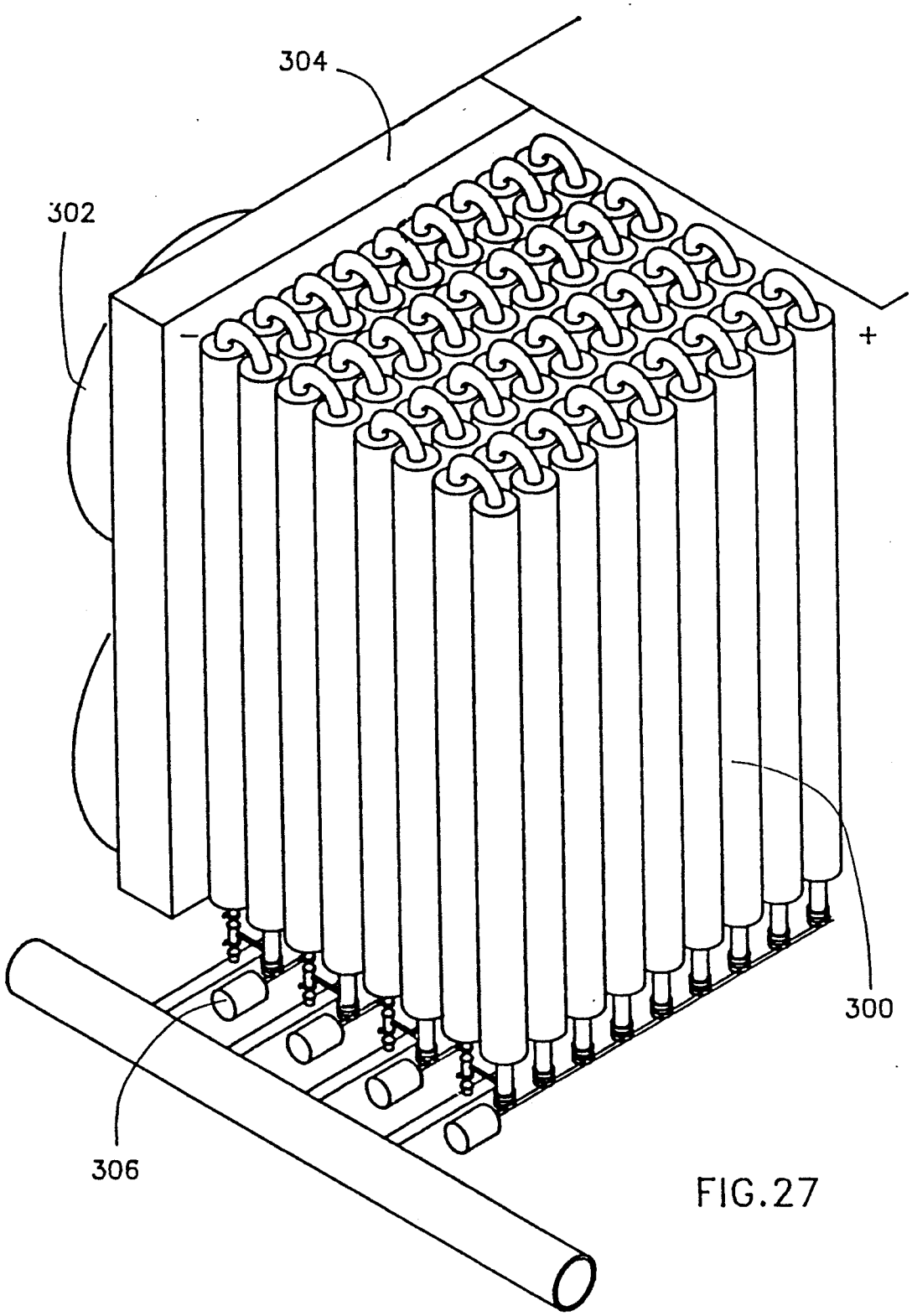
FIG. 27 is a pictoril illustration of a zinc-air utility storage battery useful in the system of FIGS. 22 and 23.

Reference is now made to FIGS. 27, 28 and 29 which illustrate the general configuration of a zinc-air utility storage battery. It is noted that the battery comprises a multiplicity of cells 300, each containing, inter alia, an air electrode 301 and a current collector 303, connected in series. Air is supplied from the outside atmosphere by a blower 302 via a $CO_2$ scrubber 304.

Slurry is pumped to and from the cells 300 by any suitable means, such as pumps 306. Thermal management apparatus 308 is provided as is a water humidifier 310. Apparatus 308 is operative to ensure optimum operating temperatures for the battery irrespective of the local ambient temperature and deals with parasitic heat generated by the battery during discharge. Humidifier 310 is operative to control the humidity of the incoming air to the battery and prevents slurry dry-out.

Figure 30:
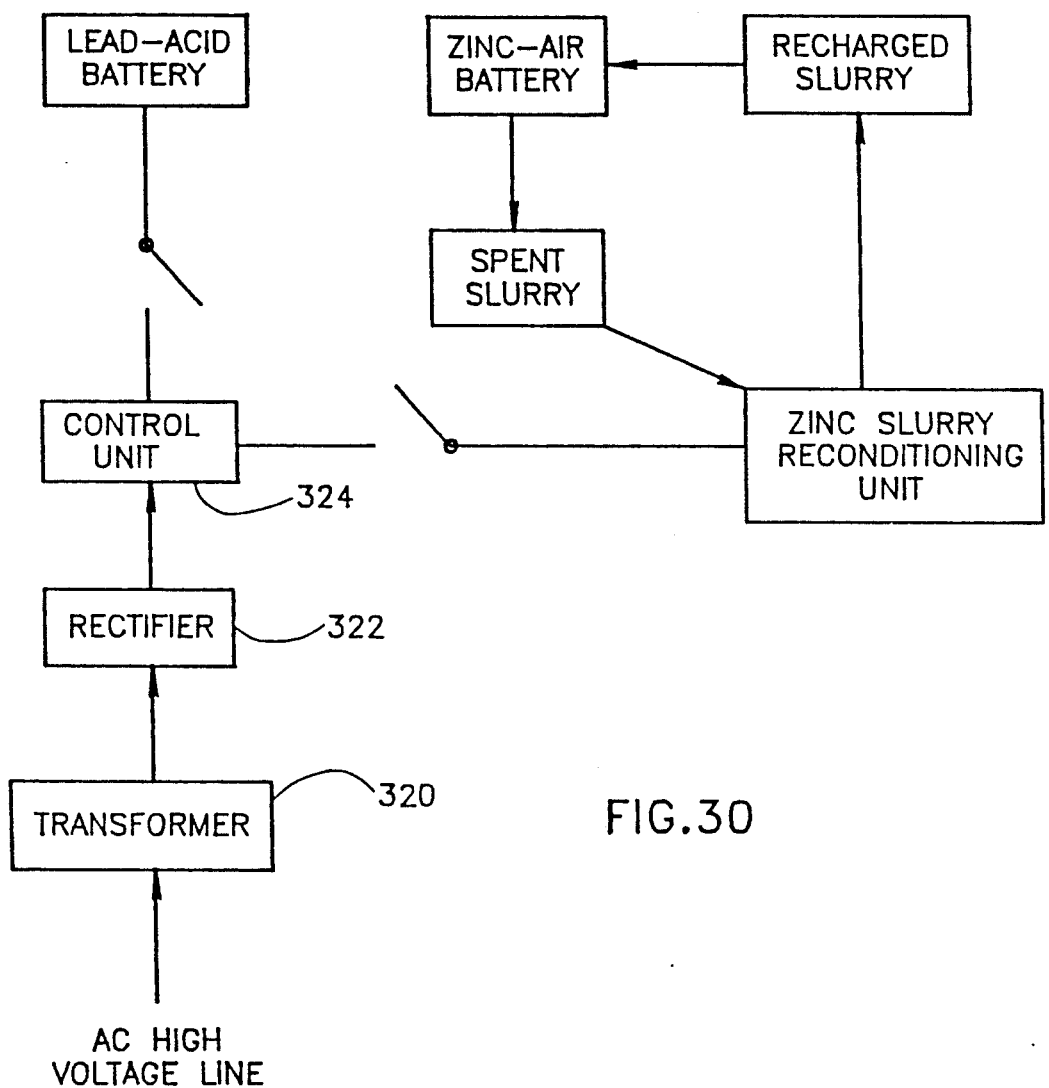
FIGS. 30 and 31 are flow chart illustrations of power station utility battery charging and discharging functions respectively.
Figure 31:
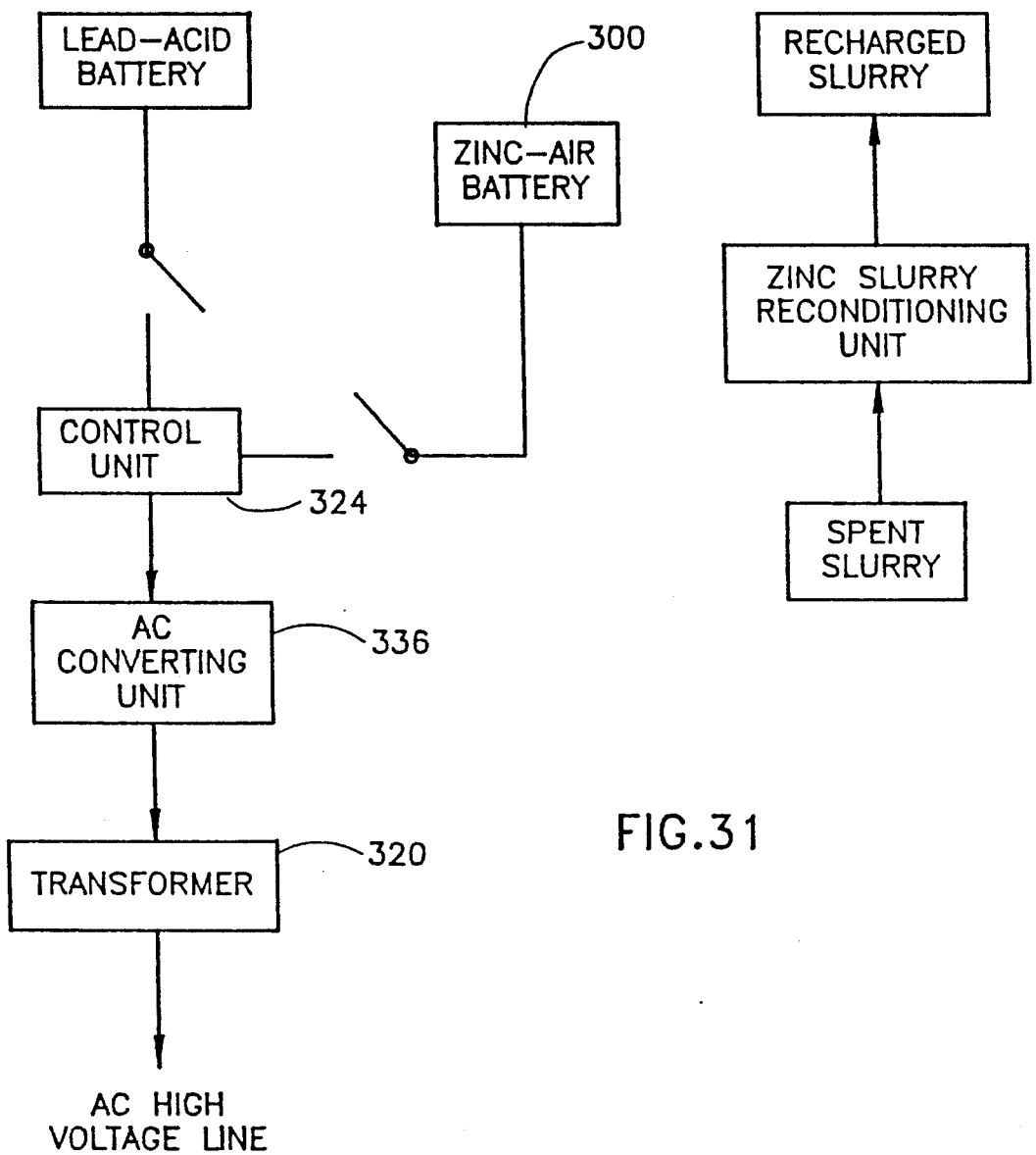

Reference is now made to FIGS. 30 and 31 which illustrate the function of the utility battery during respective charging and discharging operations. During charging, AC line power is supplied via a transformer 320, rectifier 322 and control unit 324 to the battery.

During discharge, as illustrated in FIG. 31, power from the battery 300 is supplied via control unit 324, AC converting unit 336 and transformer 320 to the AC line.

It will be appreciated by persons skilled in the art that the present invention is not limited by what has been particularly shown and described hereinabove. Rather, the scope of the present invention is defined only by the claims, which follow:

We claim:

1. An electrical power storage system comprising:
   an electrical power storage unit having at least one rechargeable electrical cell which comprises:
   a pair of generally planar outer electrode means configured to define therebetween an interior space for an electrical power storage medium; and
   inner electrode means removably mounted between said pair of outer electrode means so as to be in electrically conductive contact with said electrical power storage medium and defining a plurality of volumes each having a pair of open ends, each open end facing an adjacent outer electrode means; and
   means for replacing a discharged volume of said electrical power storage medium with a charged volume of said electrical power storage medium,
   wherein said cell is a metal-gas battery cell and said electrical power storage medium contained in said interior space comprises a bed of power storage slurry containing active metal particles saturated with an electrolyte solution, said pair of outer electrode means defines an opening communicating with said interior space, said plurality of volumes are configured to contain portions of the bed of slurry, and said inner electrode means is configured for removal from said interior space via said opening, thereby causing the simultaneous removal of the bed of slurry from said interior space, and
   wherein said means for replacing a discharge volume comprises:
   means for removing said inner electrode means from said interior space so as to remove therefrom the discharged volume of the electrical power storage medium,
   means for immersing said inner electrode means in a body of charged slurry so as to enable the charged slurry to flow into and fill each of said plurality of volumes, and
   means for replacing said inner electrode means in said interior space.

2. A system according to claim 1, and wherein the body of charged slurry is located in a container and said system also includes means for generating a flow of the charged slurry within said container so as to aid the filling of said plurality of volumes with the charged slurry.

* * * * *